US008135098B2

(12) United States Patent
Lee et al.

(10) Patent No.: US 8,135,098 B2

(45) Date of Patent: Mar. 13, 2012

(54) BICM DECODING IN THE PRESENCE OF CO-CHANNEL INTERFERENCE

(75) Inventors: Jungwon Lee, Cupertino, CA (US); Rohit U. Nabar, Sunnyvale, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 885 days.

(21) Appl. No.: 12/119,264

(22) Filed: May 12, 2008

(65) Prior Publication Data

US 2008/0279317 A1 Nov. 13, 2008

Related U.S. Application Data

(60) Provisional application No. 60/917,433, filed on May 11, 2007.

(51) Int. Cl.
*H04B 1/10* (2006.01)

(52) U.S. Cl. ........ 375/346; 375/316; 375/341; 375/233; 375/262; 375/265; 455/446; 455/550.1

(58) Field of Classification Search .................. 375/346, 375/316, 341, 233, 262, 265; 455/446, 550.1
See application file for complete search history.

(56) References Cited

U.S. PATENT DOCUMENTS

| | | | | |
|---|---|---|---|---|
| 2004/0091058 | A1* | 5/2004 | Tosato et al. | 375/261 |
| 2005/0278609 | A1* | 12/2005 | Kim et al. | 714/780 |
| 2007/0070932 | A1* | 3/2007 | Doron et al. | 370/328 |

FOREIGN PATENT DOCUMENTS

| | | |
|---|---|---|
| WO | WO 2006/034020 | 3/2006 |
| WO | WO 2007/038531 | 4/2007 |

OTHER PUBLICATIONS

Javaudin, Jean-Philippe et al. "On Inter-Cell Interference in OFDMA Wireless Systems" Proceedings of the European Signal Processing Conference pp. 1-4, (Sep. 9, 2005).

Kettunen, Kimmo et al. "Iterative Multiuser Receiver Utilizing Soft Decoding Information" Proceedings of the IEEE International Conference on Communications pp. 942-946 (Jun. 6, 1999).

* cited by examiner

*Primary Examiner* — Kenneth Lam
*Assistant Examiner* — Michael Neff

(57) ABSTRACT

Systems and methods are provided for computing soft information for digital information based on a received signal, where the received signal suffers from noise and interference. A receiver that decodes the received signal may estimate channel information, such as the channel gain, associated with the interfering source. The receiver may also obtain modulation information through a backbone network or by decoding control information transmitted by the interfering source. Using the modulation information and the channel information, the receiver may estimate the effect that interference has on the received signal, and may compute soft information (e.g., a log-likelihood ratio) for the digital information.

30 Claims, 14 Drawing Sheets

300
310 Estimate of network information
320 Decoder
340 De-interleaver
360 Soft bit-metric calculator
370 Radio signal

BICM DECODING IN THE PRESENCE OF CO-CHANNEL INTERFERENCE

CROSS-REFERENCE TO RELATED APPLICATIONS

This claims the benefit under 35 U.S.C. §119(e) of U.S. Provisional Application No. 60/917,433 filed May 11, 2007, which is hereby incorporated herein by reference in its entirety.

BACKGROUND OF THE DISCLOSURE

The disclosed technology relates generally to decoding received signals, and more particularly to computing soft information for information received from an intended source in the presence of interference from other sources.

There are several known wireless protocols for cellular and Internet systems. These wireless protocols attempt to provide high transmission reliability to wireless users, such as cellular telephone users, to prevent dropped telephone calls or poor voice transmissions. For example, to reduce the effect of interfering signals, the Global Systems for Mobile communications ("GSM") protocol decomposes the frequency band allocated for cellular communication into seven frequency channels. This allows a cellular telephone to tune into only the appropriate channel to avoid interfering signals that are transmitted through the other six channels. However, such a communications technique forces data transmission to occur at a fraction of the maximum possible bandwidth. Reducing the bandwidth in this manner limits the maximum data rate that can be achieved by a communications network.

SUMMARY OF THE DISCLOSURE

Accordingly, systems and methods are disclosed for computing soft information in the presence of interfering signals. These systems and methods enable wireless communication to occur without having to decompose the frequency spectrum into different frequency transmission channels.

The embodiments of the present invention can be employed in any suitable wireless communications system, such as a cellular system (e.g., a mobile network) or a wireless Internet system (e.g., a WiMAX network). Using a cellular system as an example, the cellular system may include a plurality of base stations that can each communicate with mobile stations (e.g., cellular telephones) that are within an area assigned to that base station. When a mobile station is connected to the cellular system, however, the mobile station may receive radio signals from not only an intended source (e.g., the base station assigned to cover the area that the mobile station is located in), but from one or more interfering sources (e.g., neighboring base stations transmitting data to other mobile stations). Thus, the mobile station may be configured to decode a received signal in a manner that takes into account not only characteristics of the intended source, but also any interfering sources.

The mobile station may estimate channel information associated with the one or more interferences sources. The channel information may allow the mobile station to determine how much of an effect that the interfering sources can have on a received signal. For example, the mobile station can estimate interference channel by analyzing a pilot signal received from an interfering source. From the pilot signal, the mobile station may determine an interference channel gain (e.g., magnitude and phase of the gain) associated with the physical space between the mobile station and the interfering source. Alternatively, the mobile station may compute just magnitude information for the interference channel gain, such as an average magnitude square or an instantaneous magnitude square of the interference channel gain.

The mobile station may also identify modulation information associated with each of the interfering sources (e.g., base stations). The mobile station may be able to interpret control information broadcasted from the interfering sources to determine what type of modulation scheme that each interfering source uses. For example, in WiMAX systems, each base station can transmit control information in the form of a DL-MAP message that the mobile station can interpret.

Thus, the mobile station may have both channel information and modulation information from each of the interfering sources (e.g., base stations) affecting a received signal. Using the channel information and modulation information, the mobile station can compute soft information for the information transmitted by the intended source. The soft information may be in the form of a log-likelihood ratio (LLR), for example. The mobile station can compute the LLR for the intended information by treating each received signal as a combination of an intended signal and an interference signal. That is, the mobile station does not assume that the interference can be modeled as random noise, and instead estimates the actual affect that interference signal can have on the received signal. For example, the mobile station may operate using a signal constellation set that incorporates the magnitude and/or phase information for both the signal constellation set of the intended signal and the signal constellation set of the interference signal.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
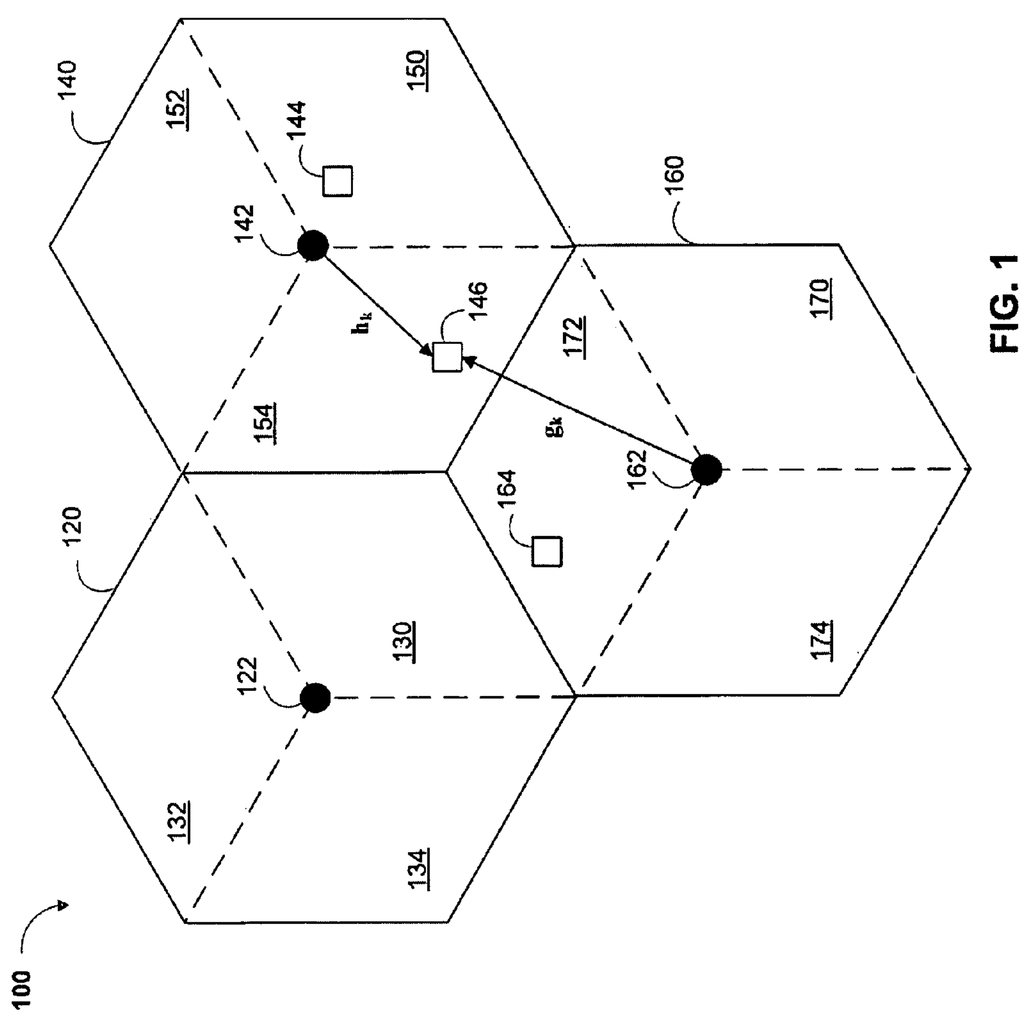
FIG. 1 is a diagram of three radio cells of an illustrative cellular system.

FIG. 1 shows a simplified diagram of illustrative cellular system 100. Cellular system 100 can include a plurality of base stations that are interconnected to form a mobile or cellular network. These base stations can include base stations 122, 142, and 162. Each of these base stations can be configured to communicate with mobile stations located within a particular physical area within that base station's radio communications range. The physical area may be referred to as a radio cell. In particular, base station 122 may communicate with mobile stations within radio cell 120, base station 142 may communicate with mobile stations within radio cell 140 (e.g., mobile stations 144 and 146), and base station 162 may communicate with mobile stations within radio cell 160 (e.g., mobile station 164). In FIG. 1, radio cells 120, 140, and 160 are represented by hexagonal regions, although this shape is merely illustrative.

Mobile stations 144, 146, and 164 may be any suitable type of cellular telephone compatible with the base stations of the mobile network. For example, mobile stations 144, 146, and 164 can operate based on a protocol or communications standard compatible with base stations 122, 142, and 162. The base stations and mobile stations of cellular system 100 can operate using any suitable conventional cellular protocol, such as the Global Systems for Mobile communications ("GSM") standard or the code division multiple access ("CDMA") standard, or using a non-conventional protocol.

The base stations and mobile stations in cellular system 100 may use any of a variety of modulation and coding schemes to enable reliable communication. For example, base stations 122, 142, and 162 may operate with a modulation scheme based on orthogonal frequency division multiplexing ("OFDM"). Further examples of suitable modulation and coding schemes will be discussed in detail below in connection with FIGS. 2 and 3. To notify the mobile stations of the modulation and coding used by a base station, base stations 122, 142, and 162 may broadcast a control sequence to at least the mobile stations within their respective radio cells. In addition to coding and modulation information, the control sequence may also include any other suitable control information that the mobile stations may use to interpret the data sent by a base station. For example, the control sequence may include information on how the data frames are structured, how many symbols are included in each frame, and the intended recipient (e.g., mobile station) of the next data block.

Base stations 122, 142, and 162 may also transmit a pilot signal to each mobile station within its radio cell to provide each mobile station with, among other things, phase alignment information. The pilot signal may be modulated by a particular pseudo-noise ("PN") sequence, and each base station may utilize a different PN sequence. The different PN sequences may allow the mobile stations (e.g., mobile station 144) to identify the base station associated with a received pilot signal.

Base stations 122, 142, and 162 may broadcast a pilot signal, control information, and network data to all mobile stations that are within radio communication range. This allows each base station to not only transmit information to any mobile station within that base station's radio cell, but also to mobile stations in neighboring radio cells that are sufficiently close to the base station. For example, due to the proximity of mobile station 144 to base station 142 in radio cell 140, mobile station 144 may predominantly receive information from base station 142. Mobile station 146, on the other hand, may be able to receive information not only from base station 142 in radio cell 140, but may also receive interfering information from base station 162 in neighboring radio cell 160. If base stations 142 and 162 operate using the same frequency band or channel such that signals received from these two sources are not easily distinguishable, mobile station 146 may suffer from an effect referred to sometimes as "inter-cell co-channel interference" (or simply "co-channel interference" or "interference").

For simplicity, the radio signal expected by mobile station 146 (e.g., from base station 142, or the "intended source") may sometimes be referred to as the "intended signal," and the channel gain of the corresponding channel (e.g., the "intended channel") may sometimes be referred by the symbol, $h_k$. The radio signal from a neighboring mobile station (e.g., from base station 162, or the "interfering source") may sometimes be referred to as the "interference signal," and the channel gain of the corresponding channel (e.g., the "interference channel") may sometimes be represented by the symbol, $g_k$.

In many scenarios, the co-channel interference (e.g., the effect of base station 162 on mobile station 146) may be stronger than any noise that may occur during data transmission from base station to mobile station. This may be especially true when a mobile station is near the boundary of two radio cells. In current communications protocols, such as GSM, co-channel interference is circumvented by having neighboring base stations broadcast network data using different frequency channels. For example, if cellular system 100 were to operate using one of these current protocols, the mobile network can assign a first frequency channel to base station 122 and radio cell 120, a second frequency channel to base station 142 and radio cell 140, and a third frequency channel to base station 162 and radio cell 160. By having neighboring base stations use different frequency channels, a mobile station in a particular radio cell can suffer from little to no interference from a base station in a neighboring radio cell. For example, in this scenario, even though mobile station 146 can be able to receive an interference signal from neighboring base station 162, mobile station 146 can tune into only the frequency channel of base station 142 to ensure that radio signals from base station 162 are substantially excluded.

In some embodiments, each radio cell of cellular system 100 may be further broken up into physical regions referred to sometimes as sectors, and current protocols can assign each of the sectors a different frequency channel. Radio cells may be decomposed into any suitable number of sectors (e.g., 2-10 sectors). For example, radio cell 120 may be decomposed into three sectors: sector 130, sector 132, and sector 134. Likewise, radio cell 140 may be decomposed into sector 150, sector 152, and sector 154 and radio cell 160 may be decomposed into sector 170, 174, and 176. In current protocols, each of these sectors may be assigned to a different or the same frequency channel by the mobile network. For example, the mobile network may assign each of the three sectors in radio cells 120, 140, and 160 to different frequency channels such that no neighboring sector uses the same frequency channel.

As with the example above, where each radio cell is assigned to a different frequency, this scenario also allows the mobile stations to decode received signals without concern for interference effects.

The communications technique of assigning neighboring base stations or sectors different frequency bands may be referred to as frequency reuse. Cellular system 100 may, as described above, use three different frequency channels to implement frequency reuse. Such a communications system may be referred to as having a frequency reuse of 3 or 1/3. GSM illustrates one protocol that can, in some embodiments, be implemented by the mobile network of cellular system 100. GSM uses seven different frequency channels and therefore has a frequency reuse of 7 or 1/7.

While frequency reuse ensures that mobile stations will not suffer from much interference, frequency reuse does not efficiently utilize the bandwidth made available to cellular systems. That is, cellular systems are assigned a limited amount of bandwidth. With each base station using only a fraction of the available bandwidth, each base station has a spectral efficiency (and therefore a maximum data rate) that is well below the possible spectral efficiency and data rate that can be achieved. Accordingly, embodiments of the present invention include techniques that enable a frequency reuse of one. In particular, embodiments of the present invention advantageously provide techniques that can counter the effects of inter-cell co-channel interference such that using different frequency channels in neighboring radio cells or sectors is unnecessary.

Thus, in some embodiments, base stations 122, 142, and 162 may transmit data to mobile stations using up to the full frequency band available to the mobile network. To ensure reliability in communicating the control message, which in turn allows a mobile station to accurately interpret data, the control message may be transmitted with frequency reuse. For the example of FIG. 1, base stations 122, 142, and 162 may operate using a frequency reuse of 3 or 1/3 when transmitting control information and may operating using a frequency reuse of one when transmitting data. This example applies to WiMax systems, which, if implemented here, may transmit control information referred to as a DL-MAP message with a frequency reuse of 3 or 1/3. A transmission scheme that uses frequency reuse only when transmitting control information may be advantageous, as reliability in communicating the control message is maintained without concern for inter-cell co-channel interference, while data (which can constitute the majority of the information transmitted from a base station) is transmitted with high spectral efficiency and data rate.

While some embodiments of the present invention are described in terms of a mobile station that receives intended and interfering information from various base stations, this is merely to simplify the description of the present invention. These embodiments may also be used to allow a base station to handle intended and interfering information received from various mobile stations. That is, some or all of the embodiments described herein for the downlink scenario may also be applied to the uplink scenario. Also, the present invention may be implemented not only in cellular systems, but in any application that may suffer from inter-cell co-channel interference.

Figure 2:
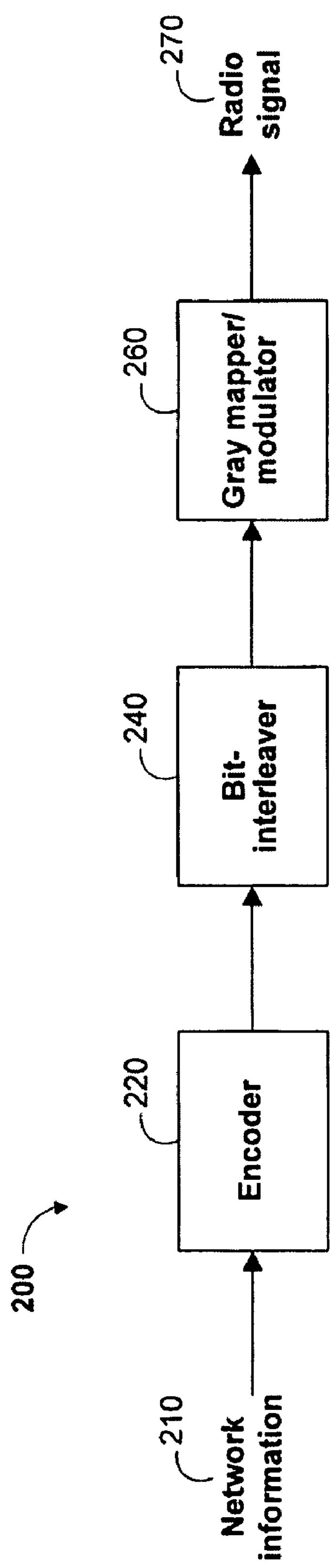
FIG. 2 is a block diagram of an illustrative base station transmitter.

FIG. 2 shows a simplified block diagram of base station transmitter 200 that can prepare network information 210 for transmission as radio signal 270. In some embodiments, base station transmitter 200 may be implemented as the transmitter for one or more of base stations 122, 142, and 162 of FIG. 1. Base station transmitter 200 can include encoder 220, bit-interleaver 240, and Gray mapper/modulator 260.

Encoder 220 may encode network information 210 based on a suitable error correcting code ("ECC"). For example, encoder 220 may operate using a convolutional code (e.g., a rate-1/2 or rate-2/3 convolutional code) of memory m. Encoder 220 may therefore convert network information 210, which may be some form of digital information (e.g., a stream of binary data), into an encoded stream of binary data. Since encoder 220 may have a memory of m, each m consecutive bits in the encoded stream created by encoder 220 depends on the value of the same one bit of network information 210. In order to remove any negative effects that may result from this dependency (e.g., the inability to reliably decode when burst errors are present), the encoded stream may be interleaved by bit-interleaver 240. In particular, bit-interleaver 240 may change the order of the bits in the encoded stream to ensure that neighboring bits in the interleaved sequence are effectively independent of each other.

Gray mapper/modulator 260 of base station transmitter 200 may be configured to convert the interleaved digital sequence produced by bit-interleaver 240 into a signal for transmission. Gray mapper/modulator 260 may first group bits of the interleaved sequence into symbols based on the size of a modulation scheme, and may then modulate the symbols into a signal having a particular magnitude and phase specified by the modulation scheme. Gray mapper/modulator 260 may use any suitable modulation scheme of any of a variety of sizes. For example, Gray mapper/modulator 260 may utilize a quadrature amplitude modulation ("QAM") scheme (e.g., 4QAM, 16QAM, 32QAM) or a phase shift keying ("PSK") modulation scheme (e.g., QPSK, 16PSK, 32PSK).

The particular modulation scheme employed by Gray mapper/modulator 260 may be designed to operate effectively with the particular error correcting code (ECC) employed by encoder 200. This type of communications technique is commonly referred to as coded modulation. Therefore, as base station transmitter 200 of FIG. 2 also includes bit-interleaver 240, the overall communications technique employed by base station transmitter 200 can be referred to as bit-interleaved coded modulation ("BICM").

Figure 4:
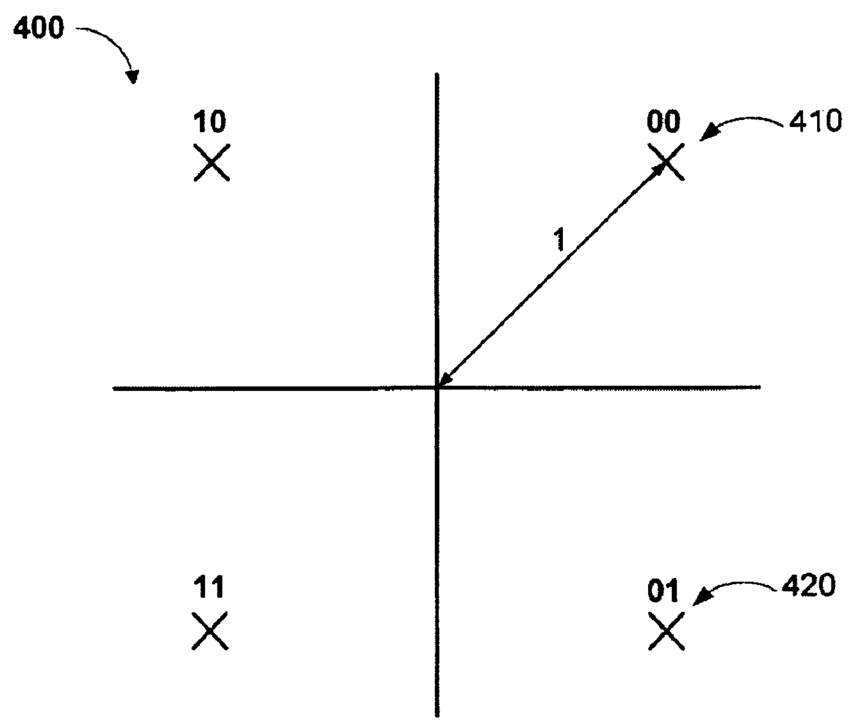
FIG. 4 is a signal constellation set for a QPSK modulation scheme that illustrates signals that may be transmitted by a base station transmitter.

The modulation scheme used by Gray code mapper/modulator 260 may be associated with a signal constellation set that defines the magnitude and phase of a carrier signal that is transmitted for each possible symbol value. For example, FIG. 4 shows an illustrative signal constellation set 400 for a 4QAM/QPSK system, where each "X" represents a signal constellation point having a particular phase and magnitude. For example, signal constellation point 420 has a magnitude of one and a phase of −45 degrees. Thus, when that signal constellation point is selected for transmission, Gray mapper/modulator 260 may produce a radio signal that has a magnitude of one and a phase of −45 degrees.

Each signal constellation point in signal constellation set 400 is associated with a particular two-bit symbol. The symbols may be assigned to the signal constellation points based on a Gray code mapping. Gray code mapping maps neighboring signal points in the modulation scheme to symbols that differ in only one bit. For example, in FIG. 4, the two signal points that correspond to symbols differing by two bits ("00" and "11") are not neighboring signal points. Gray code mapping therefore ensures that, even if a signal were mistaken for a neighboring signal point when decoded, the incorrectly decoded signal can be incorrect in only one bit.

Returning to FIG. 2, Gray code mapper/modulator 260 may produce radio signal 270 for transmission to one or more mobile stations (e.g., mobile stations 144, 146, or 162). Radio signal 270 may sometimes be represented by the variable, x. At some time, k, radio signal 270 may represent a symbol of encoded/interleaved network information 210, and at some time, k+1, radio signal 270 may represent the next symbol of encoded/interleaved network information 210. For simplicity, the variable $x_k$ will be used below to represent the value of radio signal 270 when sampled at a particular time, k. In some embodiments, k represents another type of dimension of radio signal 270 other than time, such as a spatial dimension or frequency dimension.

Radio signal 270 may be subject to noise (e.g., random noise or signal-dependent noise) during data transmission from base station transmitter 200 to a mobile station. In some scenarios, radio signal 270 may also be subject to co-channel interference that further distorts radio signal 270. Thus, even though radio signal 270 is transmitted, the radio signal actually received by a mobile station receiver may be considerably different from radio signal 270.

Figure 3:
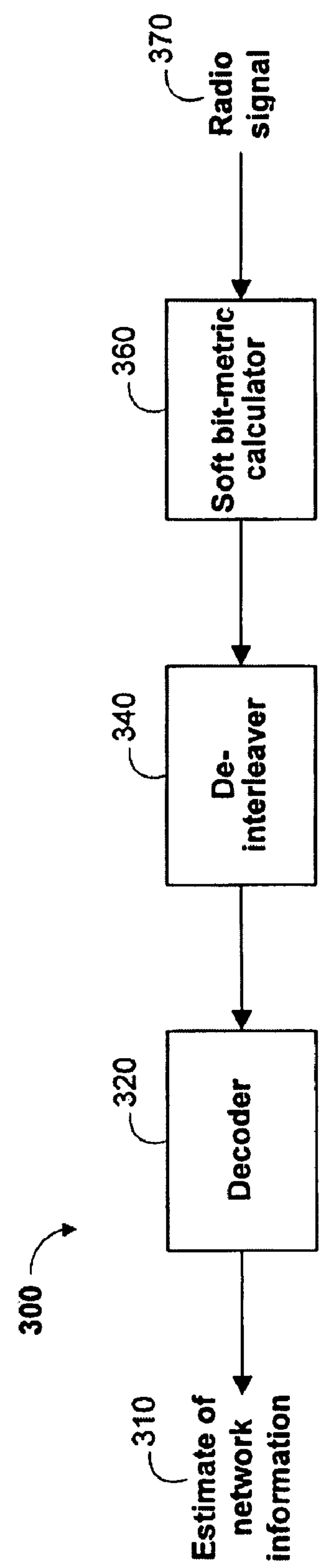
FIG. 3 is a block diagram of an illustrative mobile station receiver.

FIG. 3 shows a simplified block diagram of mobile station receiver 300. In some embodiments, mobile station receiver 300 may be implemented as part of one or more mobile stations 144, 146, and 164. Mobile station receiver 300 can be configured to receive and decode a noisy or distorted version of radio signal 270 (FIG. 2). In particular, mobile station receiver 300 may receive radio signal 370, which may be radio signal 270 after being affected by random or signal-dependent noise and inter-cell co-channel interference. Radio signal 370 may sometimes be represented by the variable, Yk for some time, k. Mathematically, radio signal 370 may be given by, $$y_k=h_kx_k+v_k. \quad \text{(EQ. 1)}$$

In EQ. 1, $h_k$ is the channel gain that represents the magnitude and phase effect of the intended channel, and $v_k$ may represent both the noise and interference affecting radio signal 270.

Since $v_k$ in EQ. 1 may be a combination of noise and interference, EQ. 1 may be re-written as, $$y_k=h_kx_k+w_k+z_k, \quad \text{(EQ. 2)}$$

where $z_k$ constitutes the noise component of $v_k$, and $w_k$ constitutes the interference component of $v_k$. Finally, as the interference signal may be associated with an interference channel gain, $g_k$ (as described above in connection with FIG. 1), EQ. 2 may be rewritten as, $$y_k=h_kx_k+g_ks_k+z_k. \quad \text{(EQ. 3)}$$

Here, $s_k$ may be a radio signal that represents a symbol that the interfering base station intends to transmit to a different mobile station. Note that $s_k$ may be associated with a modulation scheme with a different number of signal constellation points, of differing magnitudes, and with a different symbol-to-signal point mapping.

Mobile station receiver 300 can be configured to decode radio signal 370 and obtain an estimate of the originally transmitted information (e.g., network information 210 of FIG. 2). To decode radio signal 370, mobile station receiver 300 can include soft bit-metric calculator 360, de-interleaver 340, and decoder 320. Each of these receiver components may correspond to a transmitter component in base station transmitter 200 and may effectively undo the operation performed by the corresponding transmitter component. For example, soft bit-metric calculator 360 may correspond to Gray mapper/modulator 260 that can demodulate/de-map radio signal 370 using at least the modulation scheme and signal constellation set as Gray mapper/modulator 260. De-interleaver 340 may correspond to bit-interleaver 240 and may return the order of the received data into its original order, e.g., the order expected by decoder 320. Decoder 320 may be a soft-decoder that corresponds to encoder 220, and may perform decoding based on the same error correcting code (e.g., convolutional code) as encoder 220. Thus, decoder 320 may produce estimate 310 of network information (e.g., network information 210). In some embodiments, decoder 320 may be a Viterbi decoder or a Turbo decoder. If mobile station 300 successfully interprets radio signal 370, estimate 310 may be the same digital sequence as network information 210.

Referring to soft bit-metric calculator 360 of FIG. 3 in more detail, soft bit-metric calculator 360 may calculate soft information for each bit of information contained within radio signal 370. The soft information may be in the form of a log-likelihood ratio ("LLR") for each received bit. Alternatively, the soft information can be proportional to an LLR. Soft bit-metric calculator 360 may calculate an LLR according to EQ. 4:

$$LLR(b_i|y_k)=\log\frac{Pr(b_i=0|y_k)}{PR(b_i=1|y_k)}, \quad \text{(EQ. 4)}$$

where $b_i$ is the transmitted bit contained within Yk for which the LLR is being calculated. Soft bit-metric calculator 360 can obtain a reliable log-likelihood ratio based on EQ. 4 by using accurate estimates of the channel information for both the intended channel and the interference channel and modulation information. Embodiments of mobile station receiver 300, and in particular soft bit-metric calculator 360, that can obtain reliable LLRs even in the presence of interference are described below in connection with EQ. 12 through EQ. 16 and FIGS. 6-10. However, to illustrate the advantages and improvements of these embodiments, and to simplify their description below, conventional implementations of soft bit-metric calculator 360 are first described.

Conventionally, soft bit-metric calculators are implemented assuming that any noise affecting Yk is additive white Gaussian noise ("AWGN"). That is, conventional implementations of soft bit-metric calculator 360 assume that the probability distribution function of any noise (e.g., random noise or co-channel interference) is accurately reflected by:

$$AWGN_{PDF|y_k}=\frac{1}{\sigma\sqrt{2\pi}}\exp\left(-\frac{\|y_k-E[y_k]\|^2}{2\sigma^2}\right), \quad \text{(EQ. 5)}$$

and calculate the LLR equation of EQ. 4 according to, $$LLR_i=\log\left(\sum_{x\in X_{l_i}^{(1)}}\exp\left(-\frac{|y_{k_i}-h_{k_i}x|^2}{\sigma_v^2}\right)\right)-\log\left(\sum_{x\in X_{l_i}^{(0)}}\exp\left(-\frac{|y_{k_i}-h_{k_i}x|^2}{\sigma_v^2}\right)\right) \quad \text{(EQ. 6)}$$

for each valid value of the transmit signal, x. In EQ. 6 and other equations below, $X_i^{(j)}$ is the set of symbols that have a bit value of j at bit position $b_i$, and $\sigma_v^2$ is the power of the noise and interference, $v_k$. The values used in EQ. 6 for the intended channel gain and noise and interference power may be estimates computed by the mobile station or predetermined values. In other conventional implementations, interference is not considered at all, and the noise and interference power in EQ. 6 is replaced by just the noise power, $\sigma_z^2$.

Instead of computing EQ. 6, an approximation can be implemented to simplify the complexity of the hardware (e.g., logic) or software. For example, a conventional implementation of soft bit-metric calculator 360 may employ an approximation for computing logarithms, and can instead calculate, $$LLR_{i,approx} = \frac{1}{\sigma_v^2}\left[\min_{x\in X_{l_i}^{(0)}}\{|y_{k_i} - h_{k_i}x|^2\} - \min_{x\in X_{l_i}^{(1)}}\{|y_{k_i} - h_{k_i}x|^2\}\right]. \quad \text{(EQ. 7)}$$

Note that EQ. 7, unlike EQ. 6, advantageously does not include potentially resource-intensive exponential or logarithm computations. Moreover, EQ. 7 ultimately uses only two possible values of x (a first value with i=0 and a second value with i=1) to compute the approximate LLR, and not all of the possible values of x.

To improve the performance of computing soft bit-metrics, some conventional soft bit-metric calculators adaptively update the estimate of the noise and interference power, $\sigma_v^2$, such that an accurate estimate is maintained. That is, rather than using a fixed value for the noise and interference power as in EQ. 6 and EQ. 7, a conventional implementation of soft bit-metric calculator 360 treats the noise and interference power as being a function of k. One conventional implementation of soft bit-metric calculator 360 therefore computes, in place of EQ. 6 or EQ. 7, either:

$$LLR_i = \log\left(\sum_{x\in X_{l_i}^{(1)}} \exp\left(-\frac{|y_{k_i} - h_{k_i}x|^2}{\sigma_{v_{k_i}}^2}\right)\right) - \log\left(\sum_{x\in X_{l_i}^{(0)}} \exp\left(-\frac{|y_{k_i} - h_{k_i}x|^2}{\sigma_{v_{k_i}}^2}\right)\right) \text{ or} \quad \text{(EQ. 8)}$$

$$LLR_{i,approx} = \frac{1}{\sigma_{v_{k_i}}^2}\left[\min_{x\in X_{l_i}^{(0)}}\{|y_{k_i} - h_{k_i}x|^2\} - \min_{x\in X_{l_i}^{(1)}}\{|y_{k_i} - h_{k_i}x|^2\}\right]. \quad \text{(EQ. 9)}$$

Figure 5:
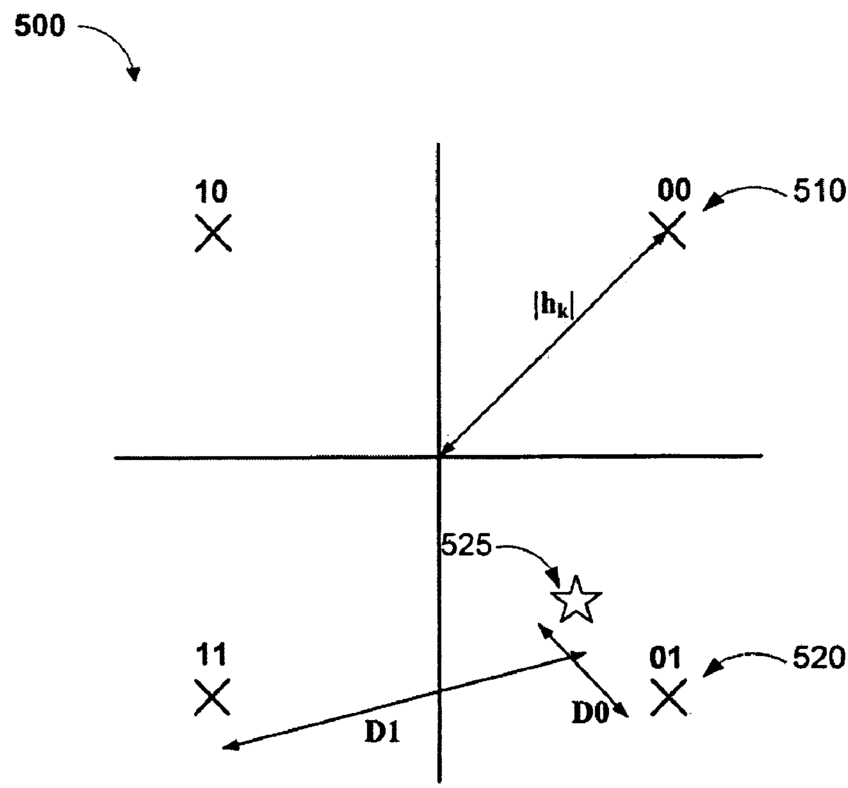
FIG. 5 is a signal constellation set for a QPSK modulation scheme that illustrates signals that may be received by a mobile station receiver.

The LLR equations of EQS. 6-9 are based on Euclidean distance calculations between radio signal 370 and the signal that can have been received had the transmitted radio signal (e.g., radio signal 270) not be subjected to noise and/or interference. The distance calculations may be visualized from a signal constellation set used by soft bit-metric calculator 360. FIG. 5 shows such a signal constellation set for a 4QAM scheme that can be used by a soft bit-metric calculator that implements any of EQ. 6 through EQ. 9 above. Signal constellation set 500 may be associated with signal constellation set 400. That is, a receiver that operates based on signal constellation set 500 of FIG. 5 may be associated with a transmitter that operates based on signal constellation set 400, where each signal point in set 500 represents the magnitude and phase of a signal received by the receiver had a signal with the magnitude and phase of a signal point in set 400 been transmitted without noise or interference. For example, as illustrated in FIGS. 4 and 5, signal point 510 in set 500 may have a magnitude substantially equal to the channel gain magnitude (e.g., $|h_k|$) when corresponding signal point 410 in set 400 has a magnitude of one.

When interference and/or noise is introduced, a sampled received signal (e.g., radio signal 370 of FIG. 3) that corresponds to a transmitted signal (e.g., radio signal 270 of FIG. 2) of signal point 420 (FIG. 4) may have a magnitude and phase of signal point 525. To compute a log-likelihood ratio according to any of EQ. 6 through EQ. 9, soft bit-metric calculator 360 (FIG. 3) may computes the Euclidean distance between each constellation point in set 500 to signal point 525. In the illustrative scenario of FIG. 5, after computing each distance, the conventional implementation of soft bit-metric calculator 360 may calculate the LLR for the most significant transmitted bit (bit 1) according to, $$LLR_{1,approx} = \frac{1}{\sigma_v^2}[D0^2 - D1^2] \text{ or} \quad \text{(EQ. 10)}$$

$$LLR_{1,approx} = \frac{1}{\sigma_{v_{k_i}}^2}[D0^2 - D1^2] \quad \text{(EQ. 11)}$$

EQ. 10 represents the equation used when conventional soft bit-metric calculator 360 operates based on EQ. 7, and EQ. 11 represents the equation used when conventional soft bit-metric calculator 360 operates based on EQ. 9.

As described above, EQ. 6 through EQ. 11 represent conventional LLR equations that operate under the assumption that both the noise and any interference affecting the received signal can be modeled as AWGN. However, as described above, the interference affecting a received signal in a cellular or WiMAX system (or in another type of system) may be considerable and may not be represented accurately using this simplification. Therefore, embodiments of the present invention are provided that can more accurately model interference signals and use this information to compute reliable soft metrics.

Mobile station receiver 300 of FIG. 3 can compute soft information for received signal 370 using accurate channel and modulation information for the interfering source. Using more than just the power of the noise and interference, soft bit-metric calculator 360 can compute a considerably more reliable and accurate log-likelihood ratio or other soft metric. To compute the channel information estimate, mobile station receiver 300 may, for example, include computational logic (not shown) that is configured to estimate the interference channel gain. The computational logic may also be configured to compute the intended channel gain. The computational logic can compute these channel information estimates by analyzing the characteristics of pilot signals received from each source. Because each source modulates the pilot signal based on a unique PN sequence, the computational logic can distinguish between the different pilot signals. From the analysis of various pilot signals, the computational logic produces an estimate of the interference and/or intended channel gain, for example. Mobile station receiver 300 may compute the channel information estimates at any suitable time during operation, such as at power-up, when initially connected to a base station, periodically, whenever the pilot signal is transmitted, etc. Channel information estimates can be computed in this manner for embodiments where receiver 300 is implemented on a mobile station and for embodiments where receiver 300 is implemented on a base station.

Mobile station receiver 300 may also identify modulation information associated with the interfering source. For example, in a WiMAX system, receiver 300 may include a DL-MAP decoder (not shown) that decodes a DL-MAP message received. From the DL-MAP message, mobile station receiver 300 can retrieve the modulation information. As described above, the modulation information may include the modulation scheme (e.g., QAM, PSK, PAM), the size of the modulation scheme, and the magnitude/phase associated with the modulation scheme. Since a DL-MAP message or other control message may be heavily encoded and may be transmitted using frequency reuse, the receiver may be able to accurately decode the control information from the interfering source even if noise and/or interference prevents receiver 300 from accurately decoding regular data from the interfering source.

For embodiments where soft information is being calculated by a base station, the base station may obtain modulation information by decoding a DL-MAP type of control message, as described above, or through a backbone network. In particular, for the DL-MAP case, the base station can obtain modulation information for an interfering mobile station (located in the radio cell of a neighboring base station) by decoding a DL-MAP message received from the neighboring base station. In other embodiments, the base station may communicate with the neighboring base station through the backbone network or backbone link, which establishes a path between various parts or sub-networks of the cellular system (e.g., between two base stations). That is, the base station can request modulation information from the neighboring base station through the backbone network.

With a relatively accurate estimate of the channel information and modulation information associated with the interfering source, the soft bit-metric calculator (e.g., soft bit-metric calculator 360) may compute a log-likelihood ratio according to, $$LLR_i = \log\left(\sum_{x \in X_{l_i}^{(1)}, s \in S} \exp\left(-\frac{|y_{k_i} - h_{k_i}x - g_{k_i}s|^2}{\sigma_z^2}\right)\right) - \log\left(\sum_{x \in X_{l_i}^{(0)}, s \in S} \exp\left(-\frac{|y_{k_i} - h_{k_i}x - g_{k_i}s|^2}{\sigma_z^2}\right)\right) \quad \text{(EQ. 12)}$$

or an approximation to EQ. 12, e.g., $$LLR_i = \frac{1}{\sigma_z^2}\left[\min_{x \in X_{l_i}^{(0)}, s \in S}\{|y_{k_i} - h_{k_i}x - g_{k_i}s|^2\} - \min_{x \in X_{l_i}^{(1)}, s \in S}\{|y_{k_i} - h_{k_i}x - g_{k_i}s|^2\}\right] \quad \text{(EQ. 13)}$$

Compared to EQ. 6 through EQ. 11, EQ. 12 and EQ. 13 do not treat the interference as random noise (e.g., AWGN with a distribution given by EQ. 5). Rather, EQ. 12 and EQ. 13 explicitly use the channel information and modulation information associated with the interfering source (e.g., the interference channel gain) to determine the signal values that mobile station receiver 300 should expect to receive when interference is present. That is, rather than expecting to receive the intended signal, soft bit-metric calculator 360 alters the soft information computation such that mobile station receiver 300 expects to receive a combination of the intended signal and the interference signal. Two examples of the operation of soft bit-metric calculator 360 (FIG. 3) using EQ. 12 or EQ. 13 will be described below in connection with FIGS. 6-9.

Figure 6:
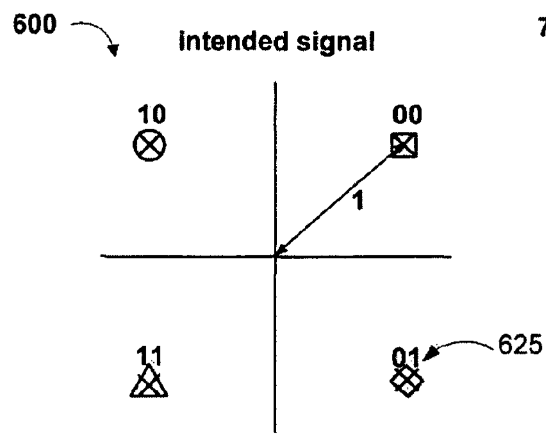
FIG. 6 is a signal constellation set for a QPSK modulation scheme that illustrates an intended signal that may be transmitted by a base station transmitter.
Figure 7:
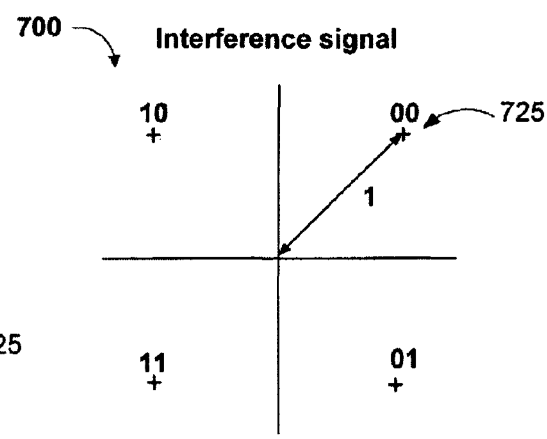
FIG. 7 is a signal constellation set for a QPSK modulation scheme that illustrates an interference signal that may be transmitted by a base station transmitter.
Figure 8:
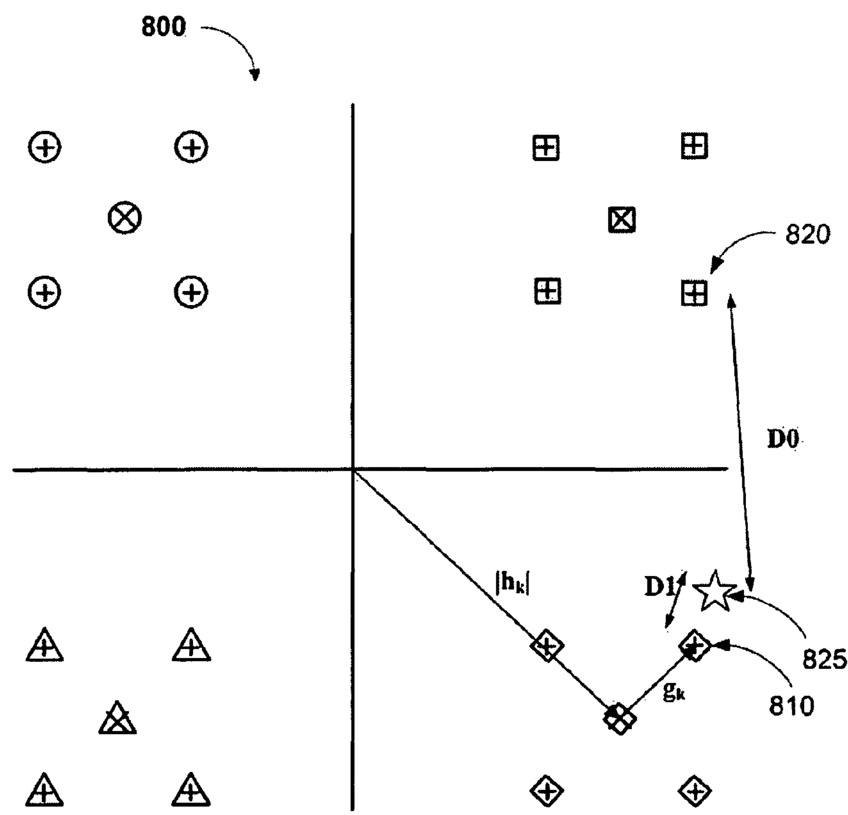
FIGS. 8-9 are signal constellation sets illustrating signal points that may be received by a mobile station receiver from a combination of the intended signal and the interference signal of FIGS. 6 and 7, respectively.
Figure 9:
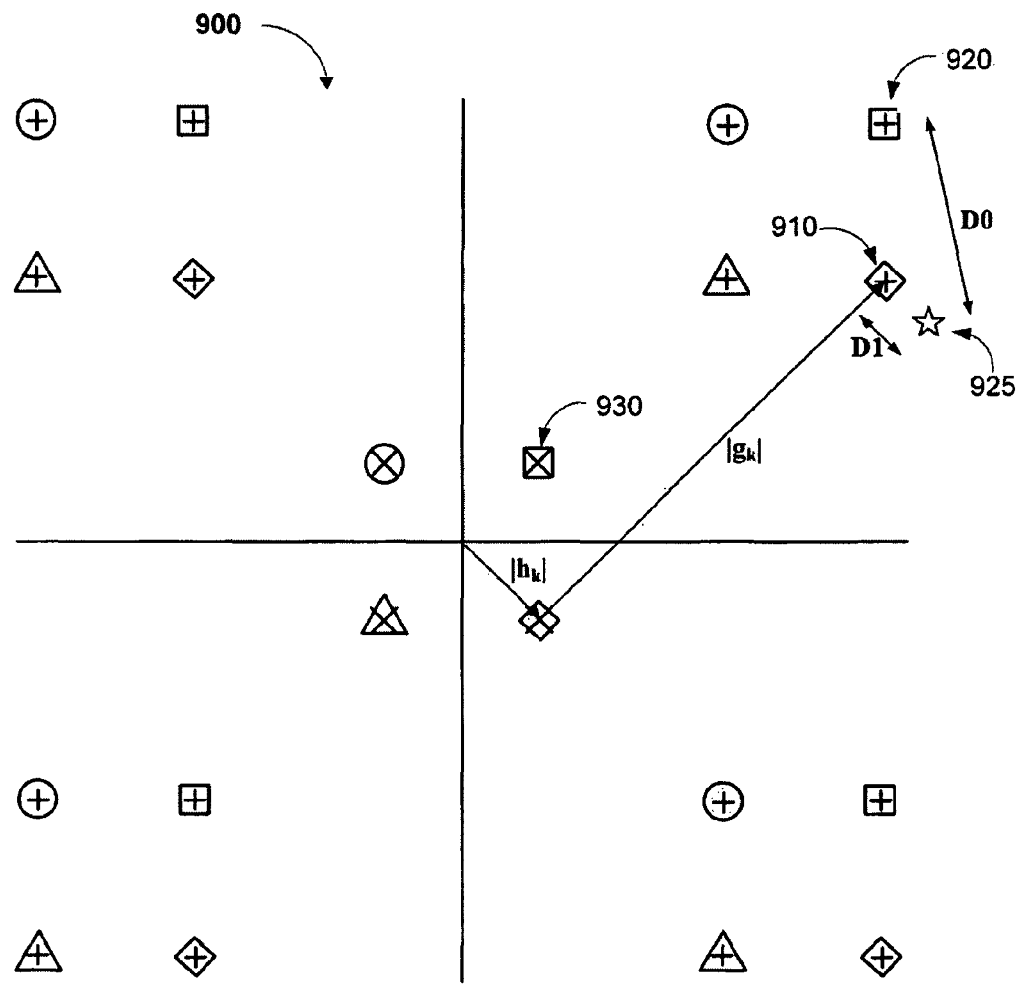

FIGS. 8 and 9 illustrate two operating scenarios when mobile station receiver 300 receives a signal resulting from a transmitted intended signal of signal point 625 of FIG. 6 and a transmitted interference signal of signal point 725 of FIG. 7. In particular, FIGS. 8 and 9 correspond to illustrative situations when a "01" symbol is transmitted using 4QAM or QPSK with a magnitude of one and a "00" symbol is transmitted using 4QAM or QPSK also with a magnitude of one. Although these figures use a 4QAM/QPSK modulation, this is merely illustrative, and any other suitable modulation scheme may be used instead.

For clarity, in FIGS. 6-9, signal points associated with an intended signal are indicated by an "X" and signal points associated with an interference signal are indicated by a "+." Also, for clarity, each signal constellation point in FIG. 6 is outlined by a different shape (a circle, a square, diamond, or a triangle) to better differentiate the signal points. This approach is also used to FIGS. 8 and 9, which show more complicated signal constellation sets, to clearly demonstrate which signal points are associated with which intended signal.

Referring first to FIG. 8, FIG. 8 illustrates the operation of soft bit-metric calculator 360 when the interference channel gain is smaller than the intended channel gain. Since soft bit-metric calculator 360 operates based on the expected value of two signals, each with four possible values, soft bit-metric calculator 360 decodes based on a signal constellation set with sixteen (or 2^4) signal points (rather than four signal points, as was the scenario described above in connection with FIG. 5). Each signal constellation point is effectively a vector summation of the expected value of a possible intended signal and the expected value of a possible interference signal. For example, the signal point in set 800 corresponding to a transmitted signal associated with signal point 625 (FIG. 6) and signal point 725 (FIG. 7) is signal point 810. Thus, each interference signal point (e.g., indicated with a "+") in FIG. 8 represents a different one of the sixteen signal points used by soft bit-metric calculator 360 to compute log-likelihood ratios. Note that the receiver is able to obtain the interference signal points, since the receiver has knowledge of both the channel gain and the modulation scheme associated with the interfering source.

Soft bit-metric calculator 360 may calculate either EQ. 12 or EQ. 13 (or both) using the sixteen "+" signal points of signal constellation set 800 of FIG. 8. For example, if a received signal corresponding to signal point 825 is received, soft bit-metric calculator 360 may compute the squared Euclidean distance between signal point 825 and each of the sixteen signal points. All of these squared distance computations may be used to compute the LLR equation of EQ. 12. Alternatively, only two Euclidean distances may be included in the LLR computation of EQ. 13. Here, soft bit-metric calculator 360 can identify the smallest squared Euclidean distance between signal point 825 and a signal constellation point associated with an intended symbol with i=0, and the smallest Euclidean distance between signal point 825 and a different signal constellation point associated with an intended signal with i=1. In this example, soft bit-metric calculator 360 (FIG. 3) may calculate, $$LLR_{0,approx} = \frac{1}{\sigma_z^2}[D0^2 - D1^2], \quad \text{(EQ. 14)}$$

for the least significant bit, i=0. As illustrated in FIG. 8, D1 may be the Euclidean distance between signal point 825 and signal constellation point 810 (e.g., intended symbol "01" and therefore i=1), and D0 may be the Euclidean distance between signal point 825 and signal constellation point 820 (e.g., intended symbol "00" and therefore i=0).

Referring now to FIG. 9, signal constellation set 900 is shown that may be similar to signal constellation set 800 of FIG. 8, but with different channel characteristics. In particular, unlike FIG. 8, FIG. 9 illustrates the signal constellation set used by soft bit-metric calculator 360 of FIG. 3 when the interference channel gain is greater than the intended channel gain. In this scenario, the signal constellation points that correspond to the same intended signal are not delineated into separate quadrants of the plane. Each quadrant includes a signal constellation point for each of the four possible intended signals. Here, signal constellation point 902 corresponds to a transmitted "01" from the intended source and a "00" from the interfering source.

With noise, the signal that is actually received by mobile station receiver 300 (FIG. 3) may have a sampled magnitude and phase at signal point 925. The noise that occurred during transmission may account for the distance, D1, between the expected signal point, signal constellation point 910, and the actual signal point, signal point 925. Thus, by modeling both the interference signal and the intended signal, the mobile station receiver may accurately and with high confidence determine that signal point 925 actually corresponds to signal point 910. Soft bit-metric calculator 360 may again compute soft information according to EQ. 14, but where D0 is the Euclidean distance between signal point 925 and signal constellation point 920 (e.g., intended symbol "00" and therefore i=0), and D1 is the Euclidean distance between signal point 925 and signal constellation point 910 (e.g., intended symbol "01" and therefore i=1).

Note that, if the interference signal were not modeled and if only the four signal constellation points corresponding to the intended signal were used, soft bit-metric calculator 360 would incorrectly conclude that signal point 925 corresponds to signal constellation point 930. That is, of the four signal constellation points that correspond to the intended signal, signal constellation point 930 is closest in Euclidean distance to signal point 925, and therefore soft bit-metric calculator 360 can produce soft information that suggests that the transmitted symbol was "00" instead of "01." Thus, conventional methods of calculating soft information is not capable of producing reliable soft information in the presence of co-channel interference. On the other hand, the approach illustrated in FIG. 9 and EQS. 12 and 13 advantageously allows a mobile station receiver to accurately decode a received signal even in the presence of strong interference.

In some embodiments, soft bit-metric calculator 360 of FIG. 3 may use a different form of channel information to compute soft information. For example, rather than estimating the full channel gain (e.g., magnitude and phase) of associated with the interfering source, soft bit-metric calculator 360 may estimate just the magnitude information. For example, soft bit-metric calculator 360 may include computational logic to compute the average magnitude square, $\sigma_g^2$, or the instantaneous channel gain, $|g_k|^2$ of the interference channel. Then soft bit-metric calculator 360 may calculate the log-likelihood ratio for each bit of transmitted information according to $$LLR_i = \log\left(\sum_{x \in X_{l_i}^{(1)}, s \in S} \exp\left(-\frac{|y_{k_i} - h_{k_i} x|^2}{\sigma_z^2 + \sigma_g^2 |s|^2}\right)\right) - \log\left(\sum_{x \in X_{l_i}^{(0)}, s \in S} \exp\left(-\frac{|y_{k_i} - h_{k_i} x|^2}{\sigma_z^2 + \sigma_g^2 |s|^2}\right)\right) \quad \text{(EQ. 15)}$$

when an estimate of the average magnitude square is used, and $$LLR_i = \log\left(\sum_{x \in X_{l_i}^{(1)}, s \in S} \exp\left(-\frac{|y_{k_i} - h_{k_i} x|^2}{\sigma_z^2 + |g_{k_i}|^2 |s|^2}\right)\right) - \log\left(\sum_{x \in X_{l_i}^{(0)}, s \in S} \exp\left(-\frac{|y_{k_i} - h_{k_i} x|^2}{\sigma_z^2 + |g_{k_i}|^2 |s|^2}\right)\right) \quad \text{(EQ. 16)}$$

when an estimate of the instantaneous channel gain is used. Other LLR equations (or soft information of another type) may be contemplated that utilize channel information for the interference channels and does not assume that the interference can be modeled as AWGN.

Each of the embodiments described above have been described in terms of a single interfering source. This, however, is simply to prevent from overcomplicating the description of the various embodiments. It should be understood that there can be multiple interfering sources. For example, referring briefly back to FIG. 1, mobile station 146 may treat both base stations 122 and 162 as interfering sources. When multiple interfering sources are present, the above techniques may be extended to incorporate the additional interference signals. For example, the soft bit-metric calculator of the mobile station receiver may utilize additional signal constellation points when computing the soft information, where each constellation point is a vector summation of three signals—an intended signal and two interference signals.

The mobile station may be able to determine the number of interfering sources to consider. For example, in some embodiments, the mobile station receiver may attempt to decode control information (e.g., DL-MAP message) from any base station, and can consider each base station an interfering source if the mobile station receiver is able to successfully decode the control information. In some embodiments, the mobile station receiver may determine the number of interfering sources based on the number of frequency channels or the frequency reuse of the communications protocol. For example, a communications protocol with a frequency reuse of 3 or 1/3 may (e.g., WiMAX) may correspond to a system with one intended source and two interfering sources. This is again one scenario illustrated in FIG. 1.

Figure 10A:
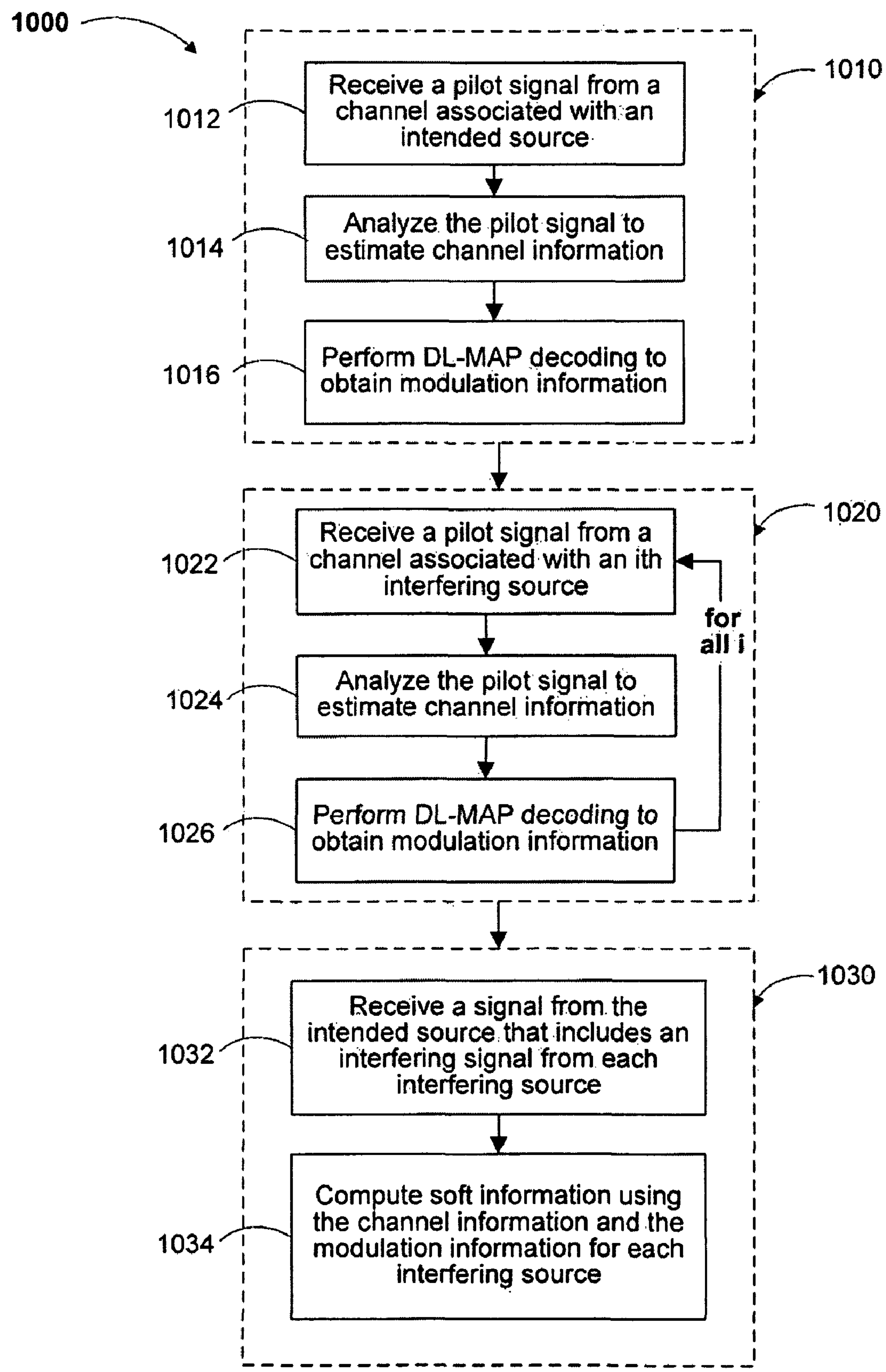
FIGS. 10A-10B shows flow diagrams of illustrative processes for estimating an intended signal in the presence of inter-cell co-channel interference.

Referring now to FIG. 10A, a flow diagram of illustrative process 1000 is shown for computing soft information for an intended signal from a received signal. The steps of process 1000 may be executed by a receiver to estimate a signal that includes both intended information and interference information. In particular, these steps may be executed by a receiver implemented on a base station to estimate a signal from an intended mobile station that includes interference from one or more interfering mobile stations, or these steps may be executed by a receiver implemented on a mobile station (e.g., mobile station 146 of FIG. 1) to estimate a signal from an intended base station that includes interference from one or more interfering base stations.

Process 1000 may have three sub-processes: sub-process 1010, sub-process 1020, and sub-process 1030. Sub-process 1010 includes steps that may be executed by the receiver to initialize information associated with an intended source, sub-process 1010 includes steps that may be executed by the receiver to initialize information associated with one or more interfering sources, and sub-process 1012 includes steps that may be taken to obtain an estimate of the information from the intended source.

At step 1012 of sub-process 1010, the receiver may receive a pilot signal from a channel associated with the intended source. Then, at step 1014, the receiver may analyze the received pilot signal to estimate channel information for that channel. For example, using the known pilot value transmitted from the intended source, the receiver may analyze the magnitude and phase of the received pilot signal to obtain an estimate of the channel gain. At step 1016, the receiver may perform DL-MAP decoding or decoding of another form to identify modulation information associated with the intended source. For example, the receiver may identify the modulation scheme (e.g., QAM, PSK, PAM) used by intended source, including the number of signal points and the magnitude/phase of the modulation scheme. Thus, steps 1012, 1014, and 1016 allow the receiver to obtain a full profile and characteristics of the intended source and its corresponding channel.

Process 1000 may continue to step 1022 and sub-process 1020 to obtain a profile and characteristics of each interfering source and channel. At step 1022, the receiver may receive a pilot pattern from the channel associated with a first interfering source, which the receiver may identify as being from the first interfering source because of the particular PN sequence used to transmit the pilot signal. Using the intended value of the pilot signal, the receiver may then analyze the pilot signal at step 1024 to obtain an estimate of channel information associated with the channel of the first interfering source. The receiver may obtain estimates of, for example, the channel gain associated with the first interference channel, the average squared magnitude of the first interference channel, or the instantaneous squared magnitude.

At step 1026, the receiver may perform DL-MAP decoding to obtain modulation information (e.g., modulation scheme and size) associated with the first interfering source. The receiver may then repeat the steps of sub-process 1020 for each remaining interfering source. For example, if there are three interfering sources, the receiver can perform steps 1022, 1024, and 1026 three times—one for each interfering source.

Process 1000 may then continue to the steps of sub-process 1030. At this point, the receiver may have relevant information on all the predominant sources that the receiver is within range of. Sub-process 1030 may begin with step 1032, where the receiver may receive a signal from the intended source that also includes an interference signal from each of the one or more interfering sources. The received signal may be a data signal with network information, for example, and may be transmitted with a frequency reuse of one. At step 1034, the receiver may compute soft information, such as one or more LLRs, for the intended signal using the channel information and the modulation information for each of the interfering sources. In particular, the receiver may use the interference channel and modulation information to obtain estimates of how the interference signals may affect the intended signal, and may compute the soft information based on these estimates.

Figure 10B:
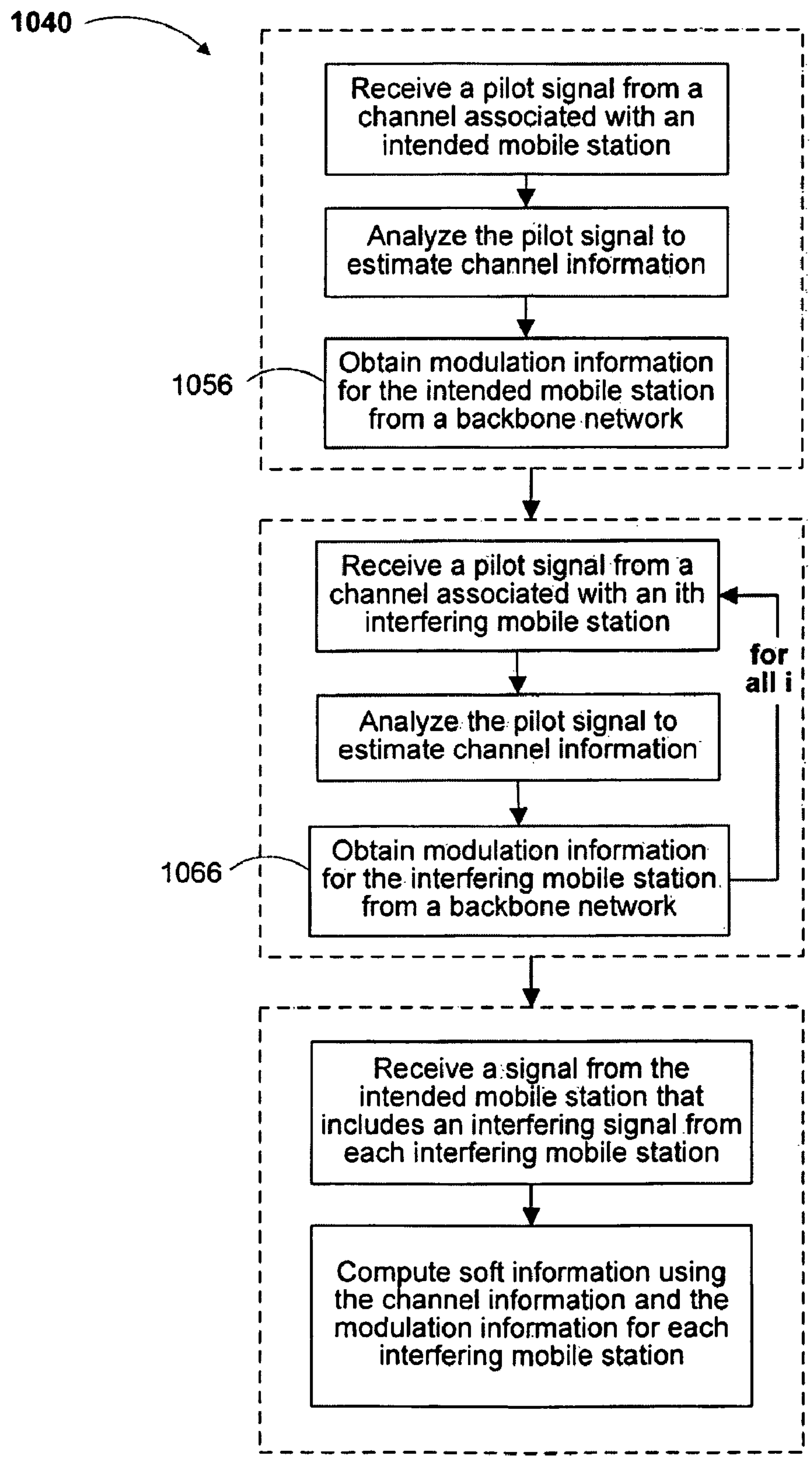

Referring now to FIG. 10B, another flow diagram is shown of an illustrative process for computing soft information for an intended signal from a received signal. The steps of process 1040 may be executed by a base station receiver that receives signals which include intended information from an intended mobile station and interference information from one or more interfering mobile stations. Thus, in some embodiments of the present invention, a base station receiver may compute soft information using process 1000 of FIG. 10A or using process 1040 of FIG. 10B.

Process 1040 may have similar steps to those of process 1000 (FIG. 10A). Therefore, the description of process 1040 will remain brief with the understanding that the description of any steps in process 1000 may apply to corresponding steps in process 1040. Process 1040 differs from process 1000 in the way in which the base station receiver obtains the modulation information that is used to compute soft information. In particular, rather than performing DL-MAP decoding based on a DL-MAP message, a base station receiver executing the steps of process 1040 can obtain this information through the backbone network at steps 1056 and 1066. For example, the base station receiver may obtain modulation information for an interfering mobile station by communicating with the base station whose radio cell the interfering mobile station is currently located in.

The steps of processes 1000 and 1040 of FIGS. 10A and 10B are merely illustrative and represent only some embodiments of the present invention. In other embodiments, one or more of the steps in process 1000 may be rearranged, combined, removed, or otherwise modified, and/or additional steps may be added. For example, the steps in sub-processes 1010 and 1020 may be rearranged such that the receiver may perform DL-MAP decoding to obtain modulation information prior to analyzing the pilot signal to obtain channel information.

Referring now to FIGS. 11-17, various exemplary implementations of the present invention are shown.

Figure 11:
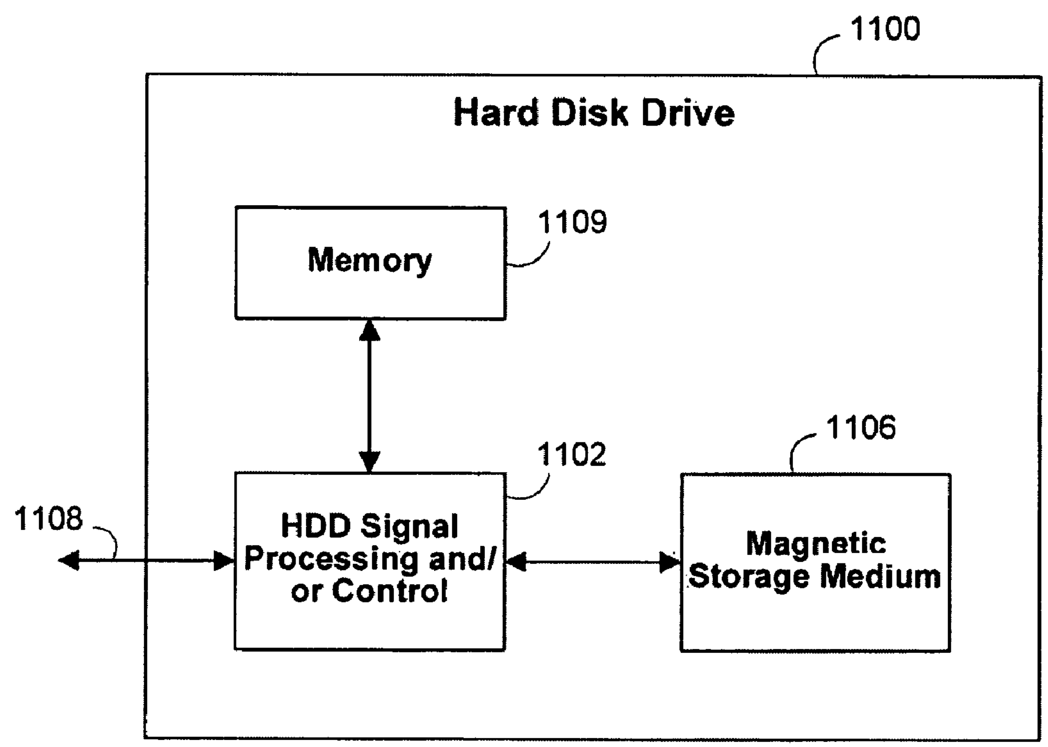
FIG. 11 is a block diagram of an exemplary hard disk drive that can employ the disclosed technology.

Referring now to FIG. 11, the present invention can be implemented in a hard disk drive (HDD) 1100. The present invention may implement either or both signal processing and/or control circuits, which are generally identified in FIG. 11 at 1102. In some implementations, the signal processing and/or control circuit 1102 and/or other circuits (not shown) in the HDD 1100 may process data, perform coding and/or encryption, perform calculations, and/or format data that is output to and/or received from a magnetic storage medium 1106.

The HDD 1100 may communicate with a host device (not shown) such as a computer, mobile computing devices such as personal digital assistants, cellular phones, media or MP3 players and the like, and/or other devices via one or more wired or wireless communication links 1108. The HDD 1100 may be connected to memory 1109 such as random access memory (RAM), nonvolatile memory such as flash memory, read only memory (ROM) and/or other suitable electronic data storage.

Figure 12:
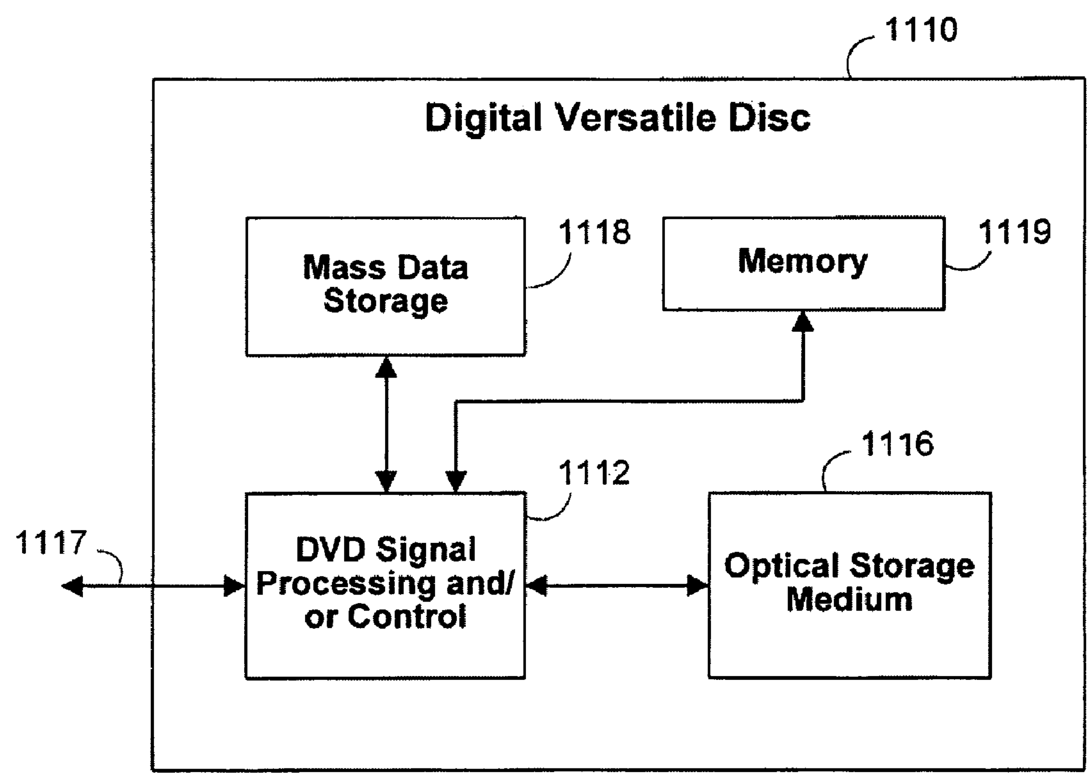
FIG. 12 is a block diagram of an exemplary digital versatile disc that can employ the disclosed technology.

Referring now to FIG. 12, the present invention can be implemented in a digital versatile disc (DVD) drive 1110. The present invention may implement either or both signal processing and/or control circuits, which are generally identified in FIG. 12 at 1112, and/or mass data storage 1118 of the DVD drive 1110. The signal processing and/or control circuit 1112 and/or other circuits (not shown) in the DVD drive 1110 may process data, perform coding and/or encryption, perform calculations, and/or format data that is read from and/or data written to an optical storage medium 1116. In some implementations, the signal processing and/or control circuit 1112 and/or other circuits (not shown) in the DVD drive 1110 can also perform other functions such as encoding and/or decoding and/or any other signal processing functions associated with a DVD drive.

The DVD drive 1110 may communicate with an output device (not shown) such as a computer, television or other device via one or more wired or wireless communication links 1117. The DVD drive 1110 may communicate with mass data storage 1118 that stores data in a nonvolatile manner. The mass data storage 1118 may include a hard disk drive (HDD). The HDD may have the configuration shown in FIG. 11. The HDD may be a mini HDD that includes one or more platters having a diameter that is smaller than approximately 1.8". The DVD drive 1110 may be connected to memory 1119 such as RAM, ROM, nonvolatile memory such as flash memory and/or other suitable electronic data storage.

Figure 13:
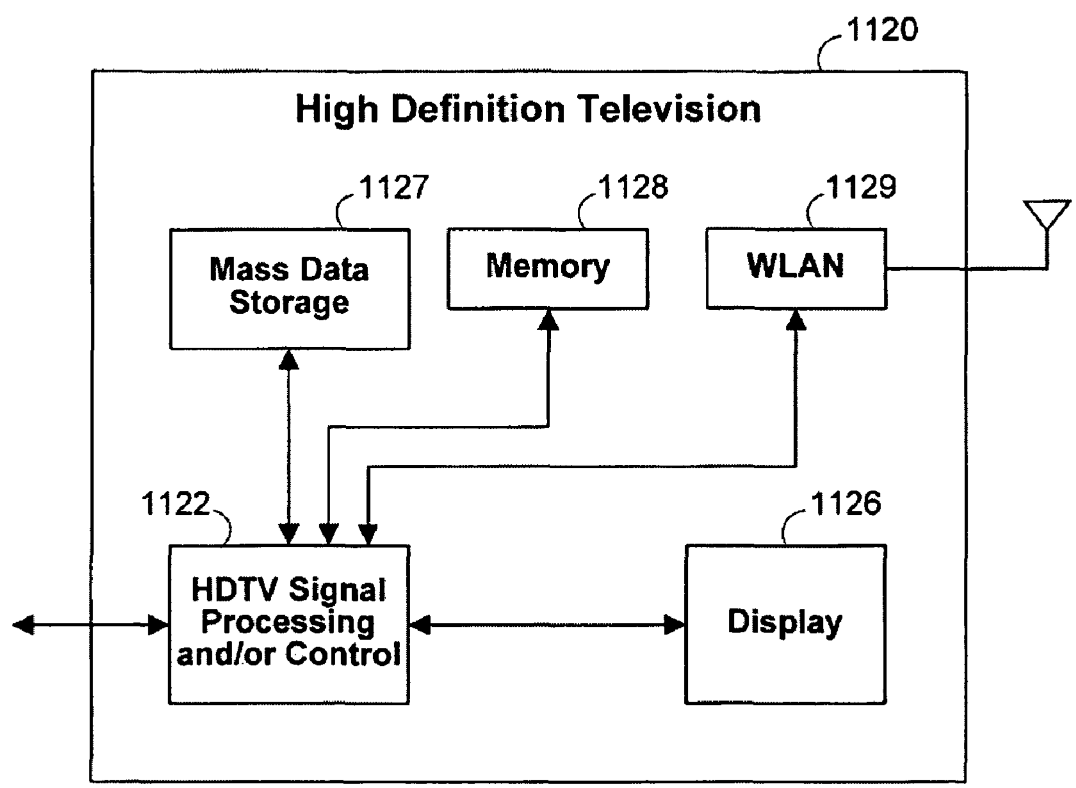
FIG. 13 is a block diagram of an exemplary high definition television that can employ the disclosed technology.

Referring now to FIG. 13, the present invention can be implemented in a high definition television (HDTV) 1120. The present invention may implement either or both signal processing and/or control circuits, which are generally identified in FIG. 13 at 1122, a WLAN network interface 1129 and/or mass data storage 1127 of the HDTV 1120. The HDTV 1120 receives HDTV input signals in either a wired or wireless format and generates HDTV output signals for a display 1126. In some implementations, signal processing circuit and/or control circuit 1122 and/or other circuits (not shown) of the HDTV 1120 may process data, perform coding and/or encryption, perform calculations, format data and/or perform any other type of HDTV processing that may be required.

The HDTV 1120 may communicate with mass data storage 1127 that stores data in a nonvolatile manner such as optical and/or magnetic storage devices for example hard disk drives and/or DVD drives. At least one HDD may have the configuration shown in FIG. 11 and/or at least one DVD drive may have the configuration shown in FIG. 12. The HDD may be a mini HDD that includes one or more platters having a diameter that is smaller than approximately 1.8". The HDTV 1120 may be connected to memory 1128 such as RAM, ROM, nonvolatile memory such as flash memory and/or other suitable electronic data storage. The HDTV 1120 also may support connections with a WLAN via WLAN network interface 1129.

Figure 14:
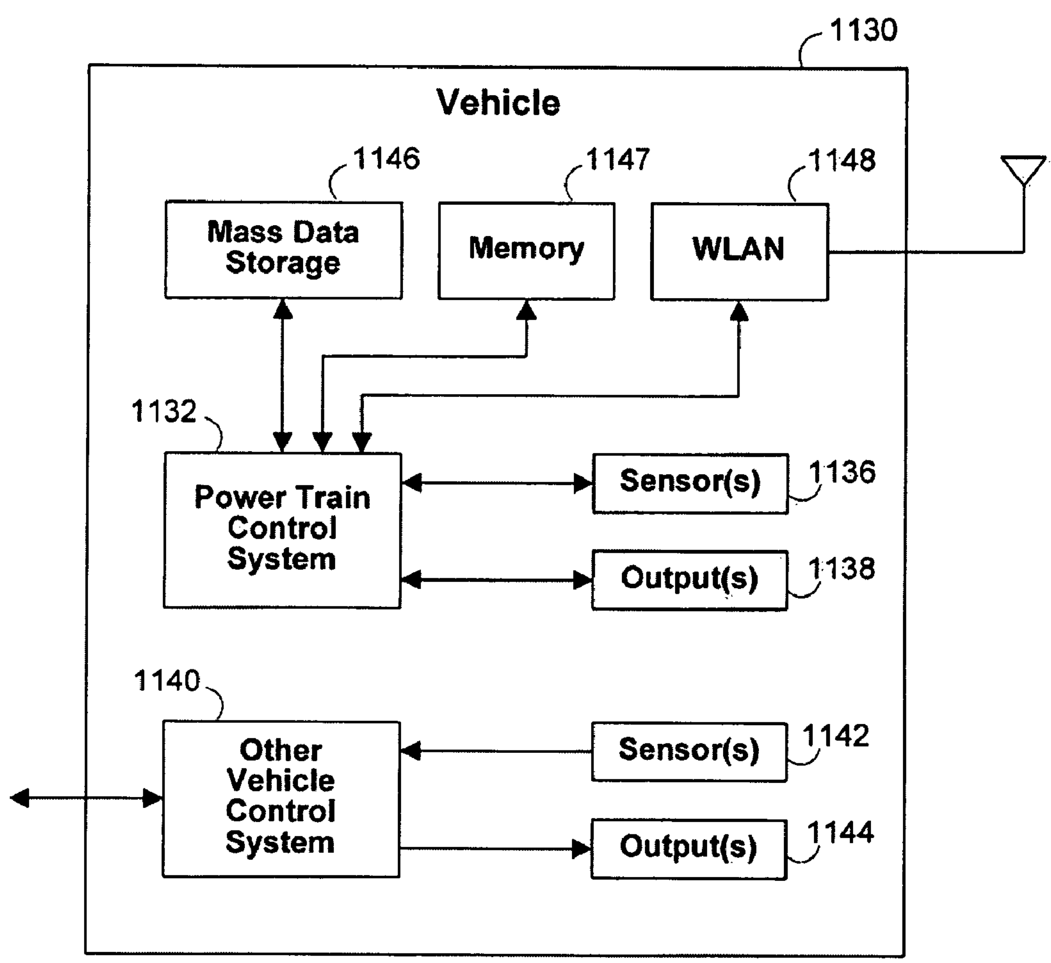
FIG. 14 is a block diagram of an exemplary vehicle that can employ the disclosed technology.

Referring now to FIG. 14, the present invention implements a control system of a vehicle 1130, a WLAN network interface 1148 and/or mass data storage 1146 of the vehicle control system. In some implementations, the present invention may implement a powertrain control system 1132 that receives inputs from one or more sensors such as temperature sensors, pressure sensors, rotational sensors, airflow sensors and/or any other suitable sensors and/or that generates one or more output control signals such as engine operating parameters, transmission operating parameters, braking parameters, and/or other control signals.

The present invention may also be implemented in other control systems 1140 of the vehicle 1130. The control system 1140 may likewise receive signals from input sensors 1142 and/or output control signals to one or more output devices 1144. In some implementations, the control system 1140 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1132 may communicate with mass data storage 1146 that stores data in a nonvolatile manner. The mass data storage 1146 may include optical and/or magnetic storage devices for example hard disk drives and/or DVD drives. At least one HDD may have the configuration shown in FIG. 11 and/or at least one DVD drive may have the configuration shown in FIG. 12. The HDD may be a mini HDD that includes one or more platters having a diameter that is smaller than approximately 1.8". The powertrain control system 1132 may be connected to memory 1147 such as RAM, ROM, nonvolatile memory such as flash memory and/or other suitable electronic data storage. The powertrain control system 1132 also may support connections with a WLAN via WLAN network interface 1148. The control system 1140 may also include mass data storage, memory and/or a WLAN network interface (all not shown).

Figure 15:
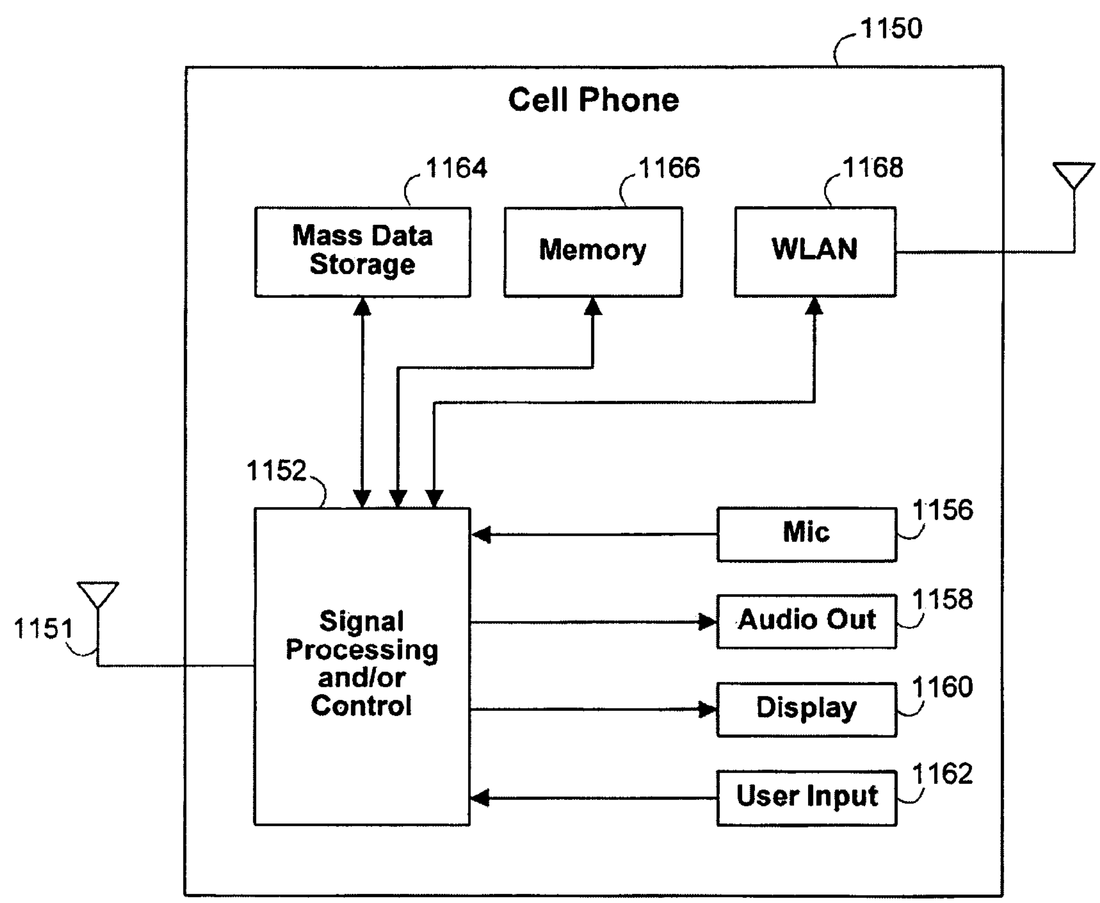
FIG. 15 is a block diagram of an exemplary cell phone that can employ the disclosed technology.

Referring now to FIG. 15, the present invention can be implemented in a cellular phone 1150 that may include a cellular antenna 1151. The present invention may implement either or both signal processing and/or control circuits, which are generally identified in FIG. 15 at 1152, a WLAN network interface 1168 and/or mass data storage 1164 of the cellular phone 1150. In some implementations, the cellular phone 1150 includes a microphone 1156, an audio output 1158 such as a speaker and/or audio output jack, a display 1160 and/or an input device 1162 such as a keypad, pointing device, voice actuation and/or other input device. The signal processing and/or control circuits 1152 and/or other circuits (not shown) in the cellular phone 1150 may process data, perform coding and/or encryption, perform calculations, format data and/or perform other cellular phone functions.

The cellular phone 1150 may communicate with mass data storage 1164 that stores data in a nonvolatile manner such as optical and/or magnetic storage devices for example hard disk drives and/or DVD drives. At least one HDD may have the configuration shown in FIG. 11 and/or at least one DVD drive may have the configuration shown in FIG. 12. The HDD may be a mini HDD that includes one or more platters having a diameter that is smaller than approximately 1.8". The cellular phone 1150 may be connected to memory 1166 such as RAM, ROM, nonvolatile memory such as flash memory and/or other suitable electronic data storage. The cellular phone 1150 also may support connections with a WLAN via WLAN network interface 1168.

Figure 16:
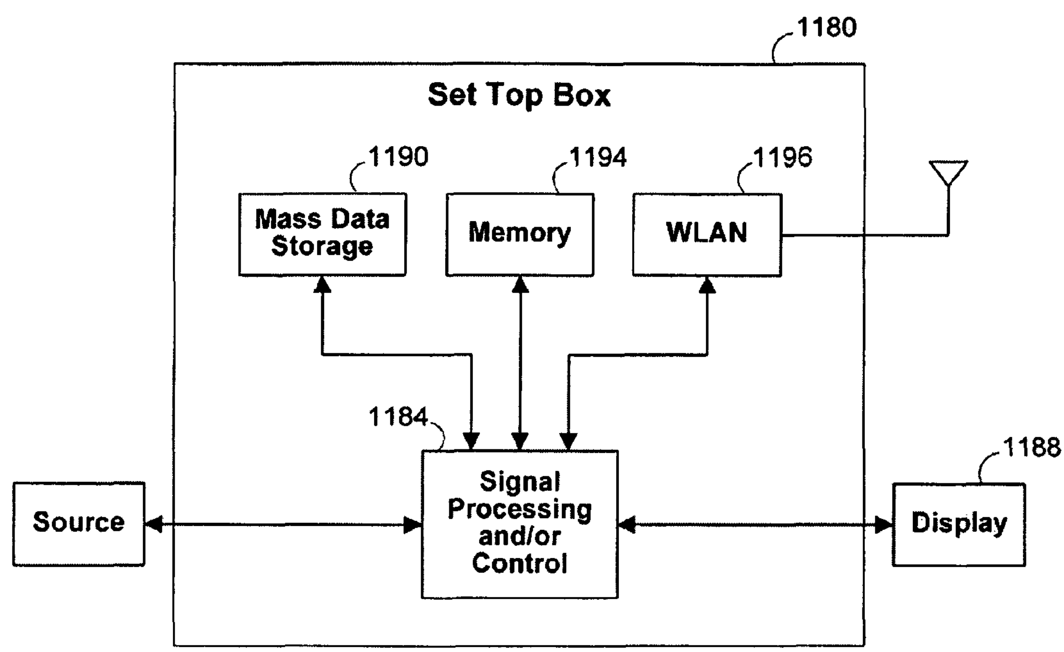
FIG. 16 is a block diagram of an exemplary set top box that can employ the disclosed technology.

Referring now to FIG. 16, the present invention can be implemented in a set top box 1180. The present invention may implement either or both signal processing and/or control circuits, which are generally identified in FIG. 16 at 1184, a WLAN network interface 1196 and/or mass data storage 1190 of the set top box 1180. The set top box 1180 receives signals from a source such as a broadband source and outputs standard and/or high definition audio/video signals suitable for a display 1188 such as a television and/or monitor and/or other video and/or audio output devices. The signal processing and/or control circuits 1184 and/or other circuits (not shown) of the set top box 1180 may process data, perform coding and/or encryption, perform calculations, format data and/or perform any other set top box function.

The set top box 1180 may communicate with mass data storage 1190 that stores data in a nonvolatile manner. The mass data storage 1190 may include optical and/or magnetic storage devices for example hard disk drives and/or DVD drives. At least one HDD may have the configuration shown in FIG. 11 and/or at least one DVD drive may have the configuration shown in FIG. 12. The HDD may be a mini HDD that includes one or more platters having a diameter that is smaller than approximately 1.8". The set top box 1180 may be connected to memory 1194 such as RAM, ROM, nonvolatile memory such as flash memory and/or other suitable electronic data storage. The set top box 1180 also may support connections with a WLAN via a WLAN network interface 1196.

Figure 17:
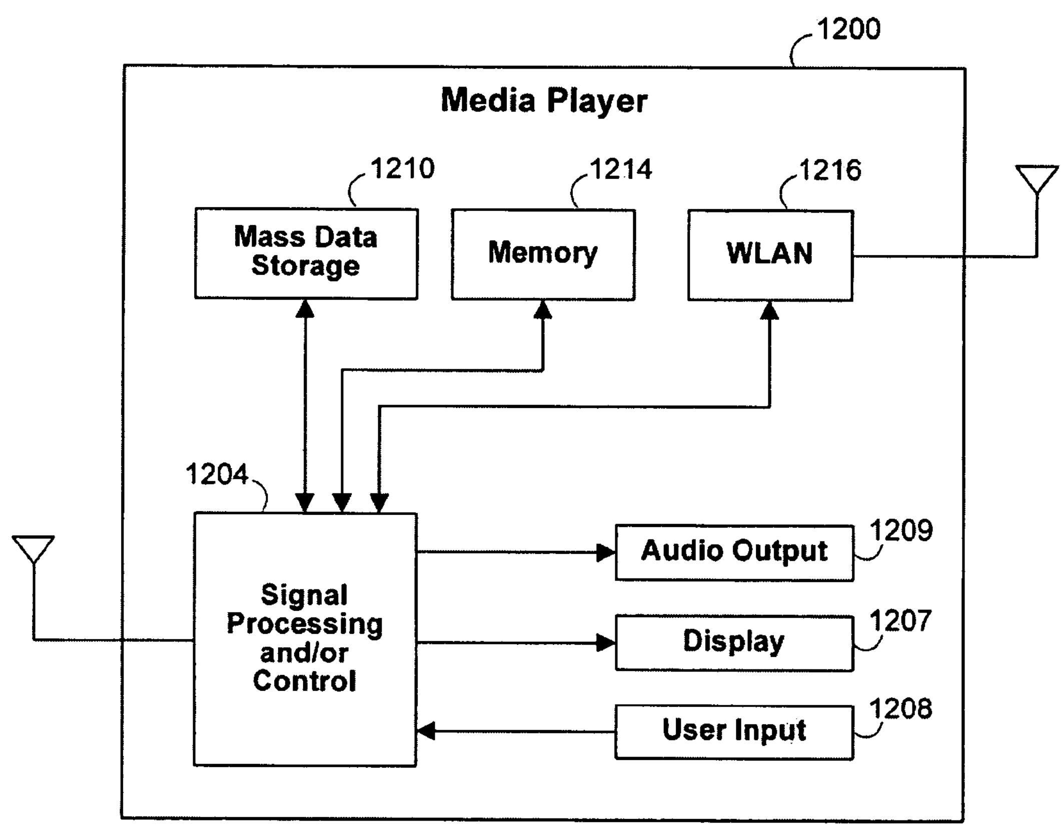
FIG. 17 is a block diagram of an exemplary media player that can employ the disclosed technology.

Referring now to FIG. 17, the present invention can be implemented in a media player 1200. The present invention may implement either or both signal processing and/or control circuits, which are generally identified in FIG. 17 at 1204, WLAN network interface 1216 and/or mass data storage 1210 of the media player 1200. In some implementations, the media player 1200 includes a display 1207 and/or a user input 1208 such as a keypad, touchpad and the like. In some implementations, the media player 1200 may employ a graphical user interface (GUI) that typically employs menus, drop down menus, icons and/or a point-and-click interface via the display 1207 and/or user input 1208. The media player 1200 further includes an audio output 1209 such as a speaker and/or audio output jack. The signal processing and/or control circuits 1204 and/or other circuits (not shown) of the media player 1200 may process data, perform coding and/or encryption, perform calculations, format data and/or perform any other media player function.

The media player 1200 may communicate with mass data storage 1210 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVD drives. At least one HDD may have the configuration shown in FIG. 11 and/or at least one DVD drive may have the configuration shown in FIG. 12. The HDD may be a mini HDD that includes one or more platters having a diameter that is smaller than approximately 1.8"The media player 1200 may be connected to memory 1214 such as RAM, ROM, nonvolatile memory such as flash memory and/or other suitable electronic data storage. The media player 1200 also may support connections with a WLAN via WLAN network interface 1216. Still other implementations in addition to those described above are contemplated.

The foregoing describes systems and methods for computing soft information at a mobile station to estimate digital information from an intended source. Generally, the invention can be practiced by other than the described embodiments, which are presented for the purpose of illustration rather than of limitation.

What is claimed is:

1. A method of computing soft information for use in estimating digital information from an intended source, the method comprising:

estimating interference channel information associated with at least one interfering source from one or more transmitted signals;

determining modulation information for the at least one interfering source;

receiving a signal corresponding to the digital information, wherein the signal includes an interference signal from the at least one interfering source; and computing soft information for the digital information from the signal based on an estimate of the interference signal obtained from the interference channel information and using the modulation information.

2. The method of claim 1, wherein the intended source and the at least one interfering source are base stations, and wherein receiving the signal comprises:

obtaining the signal corresponding to the digital information at a mobile station.

3. The method of claim 1, wherein the intended source and the at least one interfering source are mobile stations, and wherein receiving the signal comprises:

obtaining the signal corresponding to the digital information at a base station.

4. The method of claim 1, further comprising:

estimating intended channel information associated with the intended source, wherein the soft information is computed based on the intended channel information.

5. The method of claim 1, wherein estimating the interference channel information comprises:

receiving the one or more transmitted signals from the at least one interfering source; and analyzing each of the one or more transmitted signals to produce the interference channel information, wherein the interference channel information is based on information within the one or more transmitted signals.

6. The method of claim 1, wherein estimating the interference channel information comprises:

computing an estimate of a channel gain associated with the at least one interfering source.

7. The method of claim 1, wherein estimating the interference channel information comprises:

computing an estimate of an average magnitude square or an instantaneous magnitude square of a channel gain associated with the at least one interfering source.

8. The method of claim 1, wherein determining the modulation information comprises:

identifying the modulation information from a particular frequency band associated with the at least one interfering source, wherein the signal corresponding to the digital information uses a larger frequency band than the particular frequency band.

9. The method of claim 1, wherein determining the modulation information comprises:

receiving control information associated with the at least one interfering source; and performing DL-MAP decoding on the received control information.

10. The method of claim 1, wherein determining the modulation information comprises:

obtaining the modulation information from a backbone network.

11. The method of claim 1, wherein the signal corresponding to the digital information is received with a frequency reuse of one.

12. The method of claim 1, wherein computing soft information comprises computing a log-likelihood ratio (LLR) for each bit of the digital information.

13. The method of claim 12, wherein the LLR for an ith bit in the digital information is computed according to, $$LLR_i = \log\left(\sum_{x\in X_{l_i}^{(1)}, s\in S} \exp\left(-\frac{|y_{k_i} - h_{k_i}x - g_{k_i}s|^2}{\sigma_z^2}\right)\right) - \log\left(\sum_{x\in X_{l_i}^{(0)}, s\in S} \exp\left(-\frac{|y_{k_i} - h_{k_i}x - g_{k_i}s|^2}{\sigma_z^2}\right)\right),$$

where y is the received signal, h is an intended channel gain associated with the intended source, g is an interference channel gain associated with the at least one interfering source, x is at least a portion of the digital information, $l_i$ is a bit position of the ith bit, $k_i$ is a sampling time of the ith bit, s is the interference signal, and $\sigma_z^2$ is a power of noise.

14. The method of claim 12, wherein the LLR for an ith bit in the digital information is computed according to, $$LLR_i = \frac{1}{\sigma_z^2}\left[\min_{x\in X_{l_i}^{(0)}, s\in S} \{|y_{k_i} - h_{k_i}x - g_{k_i}s|^2\} - \min_{x\in X_{l_i}^{(1)}, s\in S} \{|y_{k_i} - h_{k_i}x - g_{k_i}s|^2\}\right],$$

where y is the received signal, h is an intended channel gain associated with the intended source, g is an interference channel gain associated with the at least one interfering source, x is at least a portion of the digital information, $l_i$ is a bit position of the ith bit, $k_i$ is a sampling time of the ith bit, s is the interference signal, and $\sigma_z^2$ is a power of noise.

15. The method of claim 12, wherein the LLR for an ith bit in the digital information is computed according to, $$LLR_i = \log\left(\sum_{x\in X_{l_i}^{(1)},s\in S}\exp\left(-\frac{|y_{k_i}-h_{k_i}x|^2}{\sigma_z^2+\sigma_g^2|s|^2}\right)\right)-\log\left(\sum_{x\in X_{l_i}^{(0)},s\in S}\exp\left(-\frac{|y_{k_i}-h_{h_i}x|^2}{\sigma_z^2+\sigma_g^2|s|^2}\right)\right),$$

where y is the received signal, h is an intended channel gain associated with the intended source, $\sigma_g^2$ is an average magnitude square of an interference channel gain associated with the at least one interfering source, x is at least a portion of the digital information, $l_i$ is a bit position of the ith bit, $k_i$ is a sampling time of the ith bit, s is the interference signal, and $\sigma_z^2$ is a power of noise.

16. The method of claim 1, wherein the signal corresponding to the digital information is encoded and modulated based on a bit-interleaved coded modulation (BICM) scheme.

17. Apparatus for computing soft information to estimate digital information from an intended source, the apparatus comprising:

computational logic configured to calculate an estimate of interference channel information associated with at least one interfering source from one or more transmitted signals;

an input interface to receive a signal corresponding to the digital information, wherein the signal includes an interference signal from the at least one interfering source; and a soft bit-metric calculator to compute soft information for the digital information from the signal based on an estimate of the interference signal obtained from the interference channel information and using modulation information associated with the at least one interfering source.

18. The apparatus of claim 17, wherein the apparatus is implemented on a mobile station, and wherein the intended source and the at least one interfering source are base stations.

19. The apparatus of claim 17, wherein the apparatus is implemented on a base station, and wherein the intended source and the at least one interfering source are mobile stations.

20. The apparatus of claim 17, wherein the computational logic is further configured to compute an estimate of intended channel information associated with the intended source, and wherein soft bit-metric calculator computes the soft information based on the intended channel information.

21. The apparatus of claim 17, wherein the computational logic is further configured to:

analyze each of the one or more transmitted signals to calculate the estimate of the interference channel information, wherein the estimate of the interference channel information is based on information within the one or more transmitted signals.

22. The apparatus of claim 17, wherein the computational logic is configured to compute an estimate of a channel gain associated with the at least one interfering source.

23. The apparatus of claim 17, wherein the computational logic is configured to compute an average magnitude square or an instantaneous magnitude square of a channel gain associated with the at least one interfering source.

24. The apparatus of claim 17, wherein the modulation information is obtained from decoding control information received from the at least one interfering source.

25. The apparatus of claim 17, wherein the modulation information is obtained from a backbone network.

26. The apparatus of claim 17, wherein the signal corresponding to the digital information is received by the input interface with a frequency reuse of one.

27. The apparatus of claim 17, wherein the soft bit-metric calculator computes a log-likelihood ratio (LLR) for each bit of the digital information.

28. The apparatus of claim 27, wherein the soft bit-metric calculator computes the LLR for an ith bit in the digital information according to, $$LLR_i = \log\left(\sum_{x\in X_{l_i}^{(1)},s\in S}\exp\left(-\frac{|y_{k_i}-h_{k_i}x-g_{k_i}s|^2}{\sigma_z^2}\right)\right)-\log\left(\sum_{x\in X_{l_i}^{(0)},s\in S}\exp\left(-\frac{|y_{k_i}-h_{k_i}x-g_{k_i}s|^2}{\sigma_z^2}\right)\right),$$

where y is the received signal, h is an intended channel gain associated with the intended source, g is an interference channel gain associated with the at least one interfering source, x is at least a portion of the digital information, $l_i$ is a bit position of the ith bit, $k_i$ is a sampling time of the ith bit, s is the interference signal, and $\sigma_z^2$ is a power of noise.

29. The apparatus of claim 27, wherein the soft bit-metric calculator computes the LLR for an ith bit in the digital information according to, $$LLR_i = \frac{1}{\sigma_z^2}\left[\min_{x\in X_{l_i}^{(0)},s\in S}\{|y_{k_i}-h_{k_i}x-g_{k_i}s|^2\}-\min_{x\in X_{l_i}^{(1)},s\in S}\{(y_{k_i}-h_{k_i}x-g_{k_i}s|^2\}\right],$$

where y is the received signal, h is an intended channel gain associated with the intended source, g is an interference channel gain associated with the at least one interfering source, x is at least a portion of the digital information, $l_i$ is a bit position of the ith bit, $k_i$ is a sampling time of the ith bit, s is the interference signal, and $\sigma_z^2$ is a power of noise.

30. The apparatus of claim 27, wherein the soft bit-metric calculator computes the LLR for an ith bit in the digital information according to, $$LLR_i = \log\left(\sum_{x\in X_{l_i}^{(1)},s\in S}\exp\left(-\frac{|y_{k_i}-h_{k_i}x|^2}{\sigma_z^2+\sigma_g^2|s|^2}\right)\right)-\log\left(\sum_{x\in X_{l_i}^{(0)},s\in S}\exp\left(-\frac{|y_{k_i}-h_{k_i}x|^2}{\sigma_z^2+\sigma_g^2|s|^2}\right)\right),$$

where y is the received signal, h is an intended channel gain associated with the intended source, $\sigma_g^2$ is an average magnitude square of an interference channel gain associated with the at least one interfering source, x is at least a portion of the digital information, $l_i$ is a bit position of the ith bit, $k_i$ is a sampling time of the ith bit, s is the interference signal, and $\sigma_z^2$ is a power of noise.

* * * * *